US007283119B2

(12) United States Patent
Kishi

(10) Patent No.: US 7,283,119 B2
(45) Date of Patent: Oct. 16, 2007

(54) COLOR ELECTROPHORETIC DISPLAY DEVICE

(75) Inventor: Etsuro Kishi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 439 days.

(21) Appl. No.: 10/457,358

(22) Filed: Jun. 10, 2003

(65) Prior Publication Data

US 2003/0231162 A1 Dec. 18, 2003

(30) Foreign Application Priority Data

Jun. 14, 2002 (JP) ............................ 2002-174346

(51) Int. Cl.
*G09G 3/34* (2006.01)
*G02B 26/00* (2006.01)

(52) U.S. Cl. ......................... 345/107; 359/296; 345/84

(58) Field of Classification Search ................ 345/107; 359/296

See application file for complete search history.

(56) References Cited

U.S. PATENT DOCUMENTS

| | | | | |
|---|---|---|---|---|
| 3,612,758 A | 10/1971 | Evans et al. | | 178/5.4 R |
| 3,668,106 A * | 6/1972 | Ota | | 358/305 |
| 4,695,528 A | 9/1987 | Dabisch et al. | | 430/290 |
| 5,767,826 A * | 6/1998 | Sheridon et al. | | 345/84 |
| 5,961,804 A * | 10/1999 | Jacobson et al. | | 204/606 |
| 6,017,585 A | 1/2000 | Thomas | | 427/240 |
| 6,067,185 A | 5/2000 | Albert et al. | | 359/296 |
| 6,072,621 A | 6/2000 | Kishi et al. | | 359/296 |
| 6,130,774 A | 10/2000 | Albert et al. | | 359/296 |
| 6,172,798 B1 | 1/2001 | Albert et al. | | 359/296 |
| 6,221,267 B1 | 4/2001 | Ikeda et al. | | 216/24 |
| 6,292,237 B1 | 9/2001 | Hebiguchi | | 349/39 |
| 6,583,780 B1 * | 6/2003 | Kawai | | 345/107 |
| 7,046,228 B2 * | 5/2006 | Liang et al. | | 345/107 |

FOREIGN PATENT DOCUMENTS

| | | |
|---|---|---|
| JP | 49-5598 | 2/1974 |
| JP | 55-154198 | 12/1980 |
| JP | 57-82086 | 5/1982 |
| JP | 9-185087 | 7/1997 |
| JP | 10-5727 | 1/1998 |
| JP | 2000-35589 | 2/2000 |
| JP | 2000-194020 | 7/2000 |
| JP | 2000-194021 | 7/2000 |
| JP | 2000-322007 | 11/2000 |
| JP | 2001-267525 | 9/2001 |
| WO | WO 99/53373 | 10/1999 |

* cited by examiner

*Primary Examiner*—Sumati Lefkowitz
*Assistant Examiner*—Srilakshmi K Kumar
(74) *Attorney, Agent, or Firm*—Fitzpatrick, Cella, Harper & Scinto

(57) ABSTRACT

An electrophoretic display device includes unit cells each containing i) two sets of display electrodes and a collection electrode and ii) two kinds of translucent colored electrophoretic particles having charge polarities different from each other. The unit cells are constructed so that the two display electrodes are superimposingly disposed to display the stated display color by the principle of subtractive mixture of color stimuli of the colored electrophoretic particles present on the display electrodes. Three unit cells are adjacently disposed in a same plane to form a pixel, and combinations of colors of the two kinds of translucent colored electrophoretic particles in each of the three unit cells forming the pixel are respectively one of the three primary colors and a color which provides black by subtractive mixture with one of the three primary colors.

5 Claims, 22 Drawing Sheets

+20/−20V +20/−20V
31 21
32 22
+20/−20V −20/+20V

0V +20V
−20V 0V

+20V 0V
−20V 0V

+20V 0V
0V −20V 101
21
43
44
22
102
23
45
46
24
103
31
5
32
33
5
34
DISPLAY AREA
LIGHT SCREENING AREA 101
43
21
102
22
44
45
23
103
5
31
32
5
33
DISPLAY AREA
LIGHT SCREENING AREA 21
22
31
32
47
48
49
R
G
B

COLOR ELECTROPHORETIC DISPLAY DEVICE

BACKGROUND OF THE INVENTION

1. Field of the Invention

This invention relates to a color display system in electrophoretic display devices.

2. Related Background Art

In recent years, with advancement of information machinery, the quantity of data of various information is becoming larger and larger, and the information is also outputted in various forms. The outputting of information is commonly roughly grouped into "display representation" making use of a cathode ray tube, a liquid crystal display panel or the like and "hard copy representation" on paper by means of a printer or the like.

In the display representation, there is an increasing need for display devices of low power consumption and small thickness. In particular, liquid crystal display devices have energetically been developed and commercialized as display devices adapted for such need. In liquid crystal display devices available at present, however, characters displayed on a screen may be viewed with difficulty depending on angles at which you look at the screen or under the influence of reflected light, and the task on eyesight which is caused by flickering, low luminance and so forth of a light source has not well been solved. Also, in the display representation making use of a cathode ray tube, although it provides sufficient contrast and luminance compared with the liquid crystal display, it may cause flickering for example, and can not be said to have a sufficient display quality level compared with the hard copy representation discussed below. In addition, its display units are so large and heavy as to have a very low portability.

Meanwhile, the hard copy representation has been considered to become unnecessary as information is made electronic, but in fact hard copies are still taken in a vast quantity. As reasons therefor, the following can be given. In the case of display representation of information (displayed on a screen), in addition to the above problem concerning the display quality level, the display has a resolution of 120 dpi at maximum, which is fairly lower than that of prints on paper (usually 300 dpi or higher). Hence, the display on a screen may greatly task eyesight compared with the hard copy representation. As the result, it often goes on that, even through the information can be seen on a display, it is first outputted on a hard copy. In addition, the information represented on hard copies can be arranged in a large number of sheets without any limitation of display area by the size of display as in the display representation, can be rearranged without any complicated machine operation, or can be checked in order. These are also large reasons why the hard copy representation is used in combination even though the display representation is feasible. Furthermore, the hard copy representation does not require any energy for retaining its representation, and has a superior portability that the information can be checked anytime and anywhere as long as the information is not so extremely much.

Thus, as long as any motion picture display or frequent rewriting is not required, the hard copy representation has various advantages different from the display representation, but has a disadvantage that paper is consumed in a large quantity. Accordingly, in recent years, development is energetically put forward on a rewritable recording medium (a medium on which highly visually recognizable images can repeatedly be recorded and erased in many cycles and which does not require any energy for retaining its representation). The third way of representation which has succeeded the features the hard copies have and in which images are rewritable is herein called "paper-like display".

Requirements for the paper-like display are that images are rewritable, that any energy is not required or sufficiently a low energy is enough to retain the display (memory performance), that the display has a good portability, that the display has a good quality level, and so forth. At present, as a representation method which can be regarded as the paper-like display, for example a reversible display medium is available which makes use of an organic low molecular and high molecular resin matrix system which is recorded and erased with a thermal printer head (e.g., Japanese Patent Applications Laid-Open No. 55-154198 and No. 57-82086). This system is sometimes utilized as a display area of a prepaid card, but has problems such that the contrast is not so high and the writing and erasing can only be repeated a relatively small number of times, such as 150 to 500.

As a way of display which is expected to be utilized as another paper-like display, an electrophoretic display device invented by Harold D. Lees et. al. (U.S. Pat. No. 3,612,758) is known. Besides, Japanese Patent Application Laid-Open No. 9-185087 discloses an electrophoretic display device.

This display device is constituted of a dispersion medium having an insulating liquid in which colored electrophoretic particles stand dispersed, and a pair of substrates which are set face to face holding this dispersion medium between them. It is a device in which, upon application of a voltage to the dispersion medium via the electrodes, the colored electrophoretic particles are attracted by Coulomb force to the electrode side having polarity reverse to that of electric charges the particles themselves have, by utilizing electrophoretic properties of the colored electrophoretic particles. Its display is performed utilizing differences between the color of the colored electrophoretic particles and the color of an insulating liquid having been dyed. That is, the color of the colored electrophoretic particles is perceived when the colored electrophoretic particles are kept attracted to the surface of a first electrode near to the observer side and having light transmission properties. On the contrary, when the colored electrophoretic particles are kept attracted to the surface of a second electrode distant from the observer side, the color of the insulating liquid having been dyed is perceived, which has been so dyed as to have optical characteristics different from those of the colored electrophoretic particles.

However, in such an electrophoretic display device (hereinafter often "vertical movement type electrophoretic display device"), a coloring material such as a dye or ions must be mixed in the insulating liquid, and the presence of such a coloring material tends to act as an unstable factor in electrophoretic movement because it brings about the delivering and receiving of additional electric charges, resulting in a lowering of performance, lifetime and stability as a display device in some cases.

In order to solve such a problem, an electrophoretic display device in which an electrode pair consisting of a first display electrode and a second display electrode is disposed on the same substrate and the charged electrophoretic particles are made to move horizontally as viewed from the observer side has been proposed as disclosed in Japanese Patent Applications Laid-Open No. 49-5598 and No. 10-005727. It is a device in which, utilizing electrophoretic properties of colored electrophoretic particles, display is performed by making the colored electrophoretic particles move horizontally to the substrate surface between the surface of the first display electrode and the surface of the second display electrode in a transparent insulating liquid by applying a voltage.

In such a horizontal movement type electrophoretic display device, the insulating liquid is transparent in many cases. As viewed from the observer side, the first display electrode and the second display electrode are differently colored, and either of their colors has been made to have the same color as the colored electrophoretic particles. For example, where the color of the first display electrode is black, the color of the second display electrode is white and the color of the colored electrophoretic particles is black, the second display electrode comes uncovered to look white when the colored electrophoretic particles stand distributed over the first display electrode, and looks black as the color of the colored electrophoretic particles when the colored electrophoretic particles stand distributed over the second display electrode.

Now, the most fundamental system for materializing color display in the above electrophoretic display devices is a system in which three unit cells respectively having the three primary colors consisting of RGB or YMC are disposed in parallel on the same plane to make up each pixel and the color display is performed by the principle of additive mixture of color stimuli. In either system of the vertical movement type and the horizontal movement type, each unit cell has one kind of colored electrophoretic particles, two drive electrodes and a colored electrophoretic liquid, where two colors, the color of the colored electrophoretic particles and the color of the colored electrophoretic liquid, or the color of the colored electrophoretic particles and the color of a color filter, can be shown by the movement of the particles.

For example, in Japanese Patent Applications Laid-Open No. 2000-035589, three unit cells having different colored liquids with the three primary colors are disposed in parallel to form each pixel (FIGS. 21A to 21D). FIG. 21A shows a case of white display; FIG. 21B, a case of monochrome display; FIG. 21C, a case of complementary color display; and FIG. 21D, a case of black display. Unit cells formed of microcapsules in which a colored liquid and white particles have been enclosed are ejected from nozzles so that microcapsules having different colored liquids (electrophoretic liquids) with the three primary colors, yellow (Y), cyan (C) and magenta (M) are regularly arranged. Each microcapsule changes alternately in two colors, the white which is the color of the particles and the color of the electrophoretic liquid, by the vertical movement of the white particles.

In the case of the horizontal movement type also, three unit cells showing different colors for color display are similarly arranged to make up each pixel (FIGS. 22A to 22D). FIG. 22A shows a case of white display; FIG. 22B, a case of monochrome display; FIG. 22C, a case of complementary color display; and FIG. 22D, a case of black display. Each unit cell is filled with a transparent insulating liquid containing black particles. On the display electrode surfaces of the unit cells, different color filters with the three primary colors, red (R), green (G) and blue (B), are respectively disposed in order from the left cell. Each unit cell changes alternately in two colors, the black which is the color of the particles and the color of each color filter, by the horizontal movement of the black particles.

In International Publication No. 99/53373, a structure is disclosed in which unit cell microcapsules change in three colors. Three unit cells showing different colors for color display are arranged to make up each pixel. In this structure, which is called "dual particle curtain mode", the unit cells are filled therein with an electrophoretic liquid in which two kinds of colored electrophoretic particles having different charge polarities and colors have been dispersed. By applying voltage to three drive electrodes, the two kinds of colored electrophoretic particles are made to move independently, where each unit cell can be made to change alternately in three colors, the colors of the two kinds of colored electrophoretic particles and the color of the electrophoretic liquid, or the colors of the two kinds of colored electrophoretic particles and the color of each color filter disposed on the back of each unit cell (FIGS. 23A to 23D). FIG. 23A shows a case of white display; FIG. 23B, a case of monochrome display; FIG. 23C, a case of complementary color display; and FIG. 23D, a case of black display.

In any of the above systems, when color display is performed, each pixel is formed by the three unit cells disposed adjoiningly and having colors corresponding to the three primary colors as shown in FIGS. 21A to 21D, FIGS. 22A to 22D and FIGS. 23A to 23D, and the desired display color is formed by the principle of additive mixture of color stimuli.

However, in the additive mixture of color stimuli of the three primary colors, it is theoretically impossible to achieve brightness and color sharpness (inclusive of sufficient black display) simultaneously, and it is very difficult to materialize a reflection type display device having the display quality level the printed mediums can have. Table 1 provides data showing, as indexes of display quality level in display devices, the ratios of reflected light intensity to incident light intensity in respect of white display, monochrome display (R, G, B), complementary color display (Y, M, C) and black display. It is considered that the white display intensity, the ratio of white display intensity to black display intensity and the absolute values of monochrome display intensity and complementary color display intensity reflect brightness, contrast and color sharpness, respectively. In Table 1, the numerals in parentheses in the columns of monochrome display and complementary color display are values including the white light component that does not contribute to color representation.

To regard with the conventional type display described above, in the case of the additive mixture of color stimuli by the use of white particles plus the three primary colors Y, C and M as in the structure shown in FIGS. 21A to 21D, a satisfactory level can be achieved in respect of the brightness, but colors of pastel shades lacking in color sharpness are shown because the white light component is always superimposed on the background of reflected light, and also any sufficient black is not obtainable. A sufficient black is obtainable if black particles are used, but such a measure is insufficient in respect of the brightness and the color sharpness.

On the other hand, in the case of the additive mixture of color stimuli by the use of black particles plus the three primary colors R, G and B as in the structure shown in FIGS. 22A to 22D, the intensity ratio of reflected light to incident light is ⅑ or less in the monochrome display and ⅓ or less in the white display, where any sufficient brightness is not achieved. The brightness is improved if white particles are used, but, like the case shown in FIGS. 22A to 22D, any sharp color representation is not obtainable and also any sufficient black is not obtainable.

In the structure shown in FIGS. 23A to 23D, the combination of colored electrophoretic particles with color filters which mutually stand a complementary color enables achievement of brightness about twice that of the structure shown in FIGS. 21A to 21D in respect of the monochrome display (FIG. 23B) and complementary color display (FIG.

23C), almost without damaging any color sharpness. There, however, is a problem that the reflected light intensity in the black display (FIG. 23D) is 33% and only performance with a contrast of about 3 is obtainable.

Meanwhile, a system in which plural kinds of particles having electrophoretic velocities different from one another and having different colors are dispersed in each pixel so that display colors can be changed by devising its driving method is proposed as disclosed in Japanese Patent Application Laid-Open No. 01-267525 (Toyota), U.S. Pat. No. 6,017,585, U.S. Pat. No. 6,067,185, U.S. Pat. No. 6,130,774, U.S. Pat. No. 6,172,798 (E Ink), Japanese Patent Application Laid-Open No. 2000-322007 (Brother) and so forth.

Each pixel is constituted of unit cells each containing i) two or three or more colored electrophoretic particles having different electrophoretic velocities (mobility, charge quantity and mirror force) and colors, ii) an electrophoretic liquid and iii) two drive electrodes, and the colors of a plurality of particles (plus the color of the liquid) are switched to materialize display in three or more colors. As also disclosed in Japanese Patent Applications Laid-Open No. 2000-194020 and 2000-194021 (Sony), different microcapsules are formed for every particles having a different electrophoretic velocity, and these are arranged in plurality to make up each pixel.

These systems have advantageous features that they make it unnecessary to area divide the pixels for each color, and enable bright display; and they make it unnecessary to independently provide the electrodes of a pixel for each unit cell, and can enjoy simple structure. However, their driving method in which particles arranged at display faces are separated and selected in a good precision only according to the magnitude of electrophoretic velocity is very difficult when gradational display is performed. It is also considered that the operation of writing which consists of a plurality of steps is not adaptable to the active matrix drive making use of thin film transistors (also called TFTs) and hence may bring a low utility.

SUMMARY OF THE INVENTION

Taking account of the problems discussed above, an object of the present invention is to provide a color electrophoretic display device, in particular, a reflection type color electrophoretic display device, having totally been improved in brightness and color sharpness and having achieved a display quality level closer to that of hard copy representation mediums.

The object of the present invention can be achieved by the following means.

That is, the present invention is an electrophoretic display device comprising a plurality of pixels, the pixels each containing at least two sets of drive electrodes each set comprising a display electrode and a collection electrode, and at least two kinds of translucent colored electrophoretic particles, wherein the display electrodes are superimposed to display a stated display color by the principle of subtractive mixture of color stimuli of the colored electrophoretic particles present on display electrodes.

The present invention is also an electrophoretic display device, wherein the pixels each contain three sets of drive electrodes and three kinds of translucent colored electrophoretic particles.

The present invention is still also an electrophoretic display device, wherein the pixels contain unit cells comprising in each unit cell i) two sets of drive electrodes having two display electrodes and ii) two kinds of translucent colored electrophoretic particles having charge characteristics different from each other;

the unit cells being so constructed that the two display electrodes are superimposingly disposed in each unit cell, to display the stated display color by the principle of subtractive mixture of color stimuli of the colored electrophoretic particles present on the display electrodes.

The present invention is further an electrophoretic display device, wherein the unit cells are stacked or the display electrodes formed in each unit cell are superimposed, to view the display color obtained by the principle of subtractive mixture of color stimuli according to the color of the colored electrophoretic particles present on the display electrodes, and also provides a method of driving such a display device.

DESCRIPTION OF THE PREFERRED EMBODIMENTS

The present invention is described below in greater detail with reference to the accompanying drawings.

Colored electrophoretic particles used in the following are meant to include cases in which they are transparent.

(Basic Structure of Unit Cell B)

Figure 1:
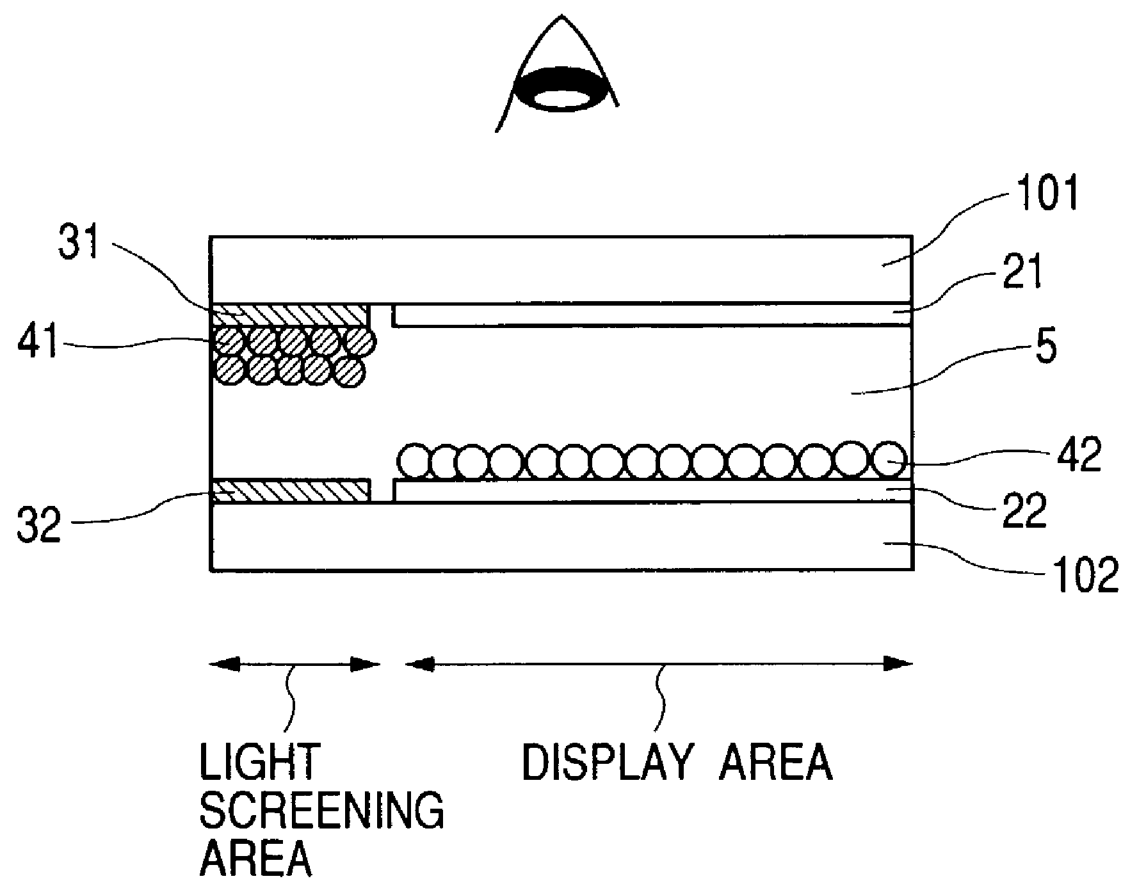
FIG. 1 is a cross sectional view showing the concept of a unit cell.

FIG. 1 is a schematic view showing an example of the cross sectional structure of a unit cell II which is a basic component of the present invention. The space between a back substrate 102 and a display side substrate 101 which are disposed fact to face leaving a constant space between them is filled with a transparent electrophoretic liquid 5. In this liquid, two kinds of colored electrophoretic particles 41 and 42 having different charge polarities and colors stand dispersed. On the display side substrate and the back substrate, display electrodes are respectively so disposed that the two electrodes face each other at a position where they lie substantially one upon another as viewed from the observer side, to form a display area. The display electrode on the display side substrate 101 is called a first display electrode 21, and the display electrode on the back substrate 102 a second display electrode 22. Of the two display electrodes, at least the first display electrode is transparent in the visible light region. Two collection electrodes are also disposed in the unit cell. As shown in FIG. 1, on the display side substrate and the back substrate, collection electrodes are respectively so disposed that the two electrodes face each other at a position where they lie substantially one upon another as viewed from the observer side, to form a light screening area. The collection electrode on the display side substrate 101 is called a first collection electrode 31, and the collection electrode on the back substrate 102 a second collection electrode 32. The light screening area may preferably be colored black. A black electrode material may also be used, or a black insulating layer may additionally be provided.

(Variations of Unit Cell Structure)

Figure 2C:
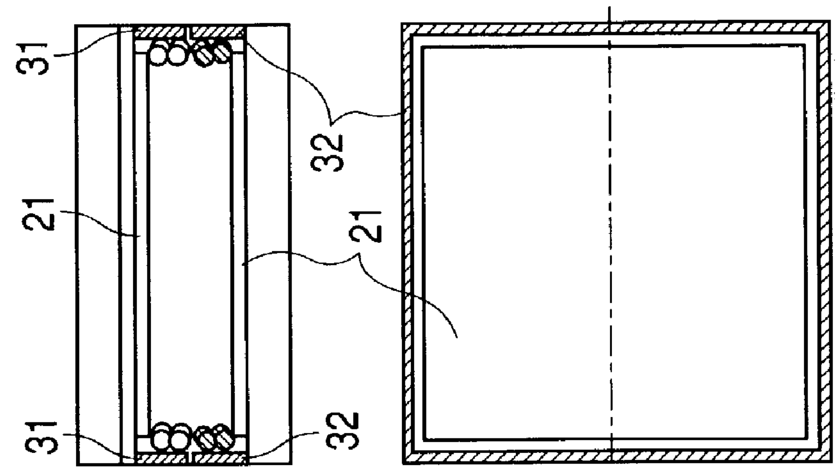
FIGS. 2A, 2B and 2C are cross sectional views showing variations of the structure of the unit cell.
Figure 2B:
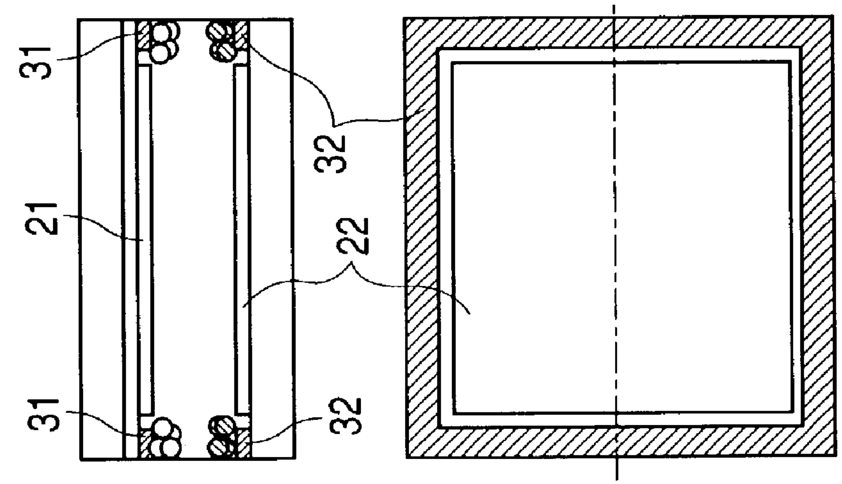
Figure 2A:
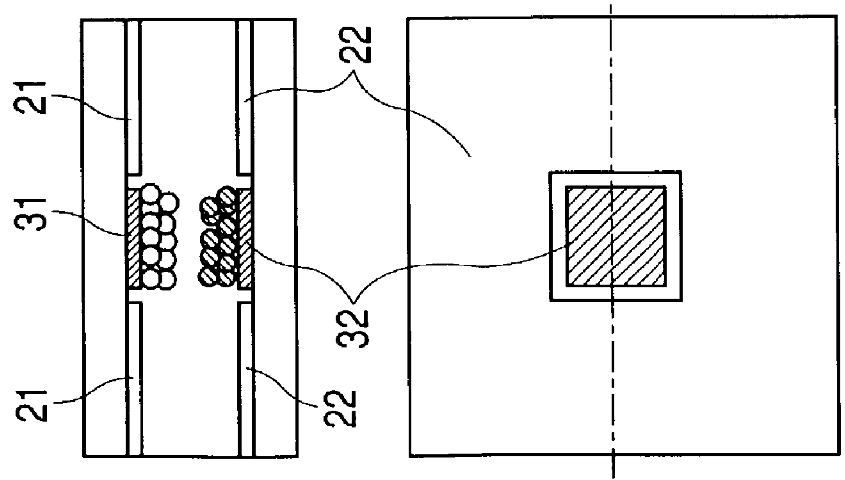

The position of the two kinds of collection electrodes is by no means limited to the disposition shown in FIG. 1. Various cases may be contemplated, such as a case in which the collection electrodes 31 and 32 are disposed at the middle of the unit cell back substrate and at the middle of the display side substrate, respectively (FIG. 2A); a case in which the collection electrodes 31 and 32 are disposed at the periphery of the unit cell back substrate and at the periphery of the display side substrate, respectively (FIG. 2B); a case in which both the two kinds of collection electrodes 31 and 32 are disposed at end portions of the unit cell back substrate (e.g., FIG. 3A); a case in which both the two kinds of collection electrodes 31 and 32 are disposed on unit cell partition wall surfaces (e.g., FIG. 3B); and a case in which the collection electrodes 31 and 32 are disposed at the upper part and the lower part of partition wall surfaces (FIG. 2C). As also shown in Examples given later, partition walls may be so formed as to serve also as the collection electrodes 31 and 32 (e.g., FIGS. 16A to 16C). Taking account of open area ratio (i.e., display electrode area ratio occupied in the cell), the case in which the two collection electrodes are disposed one by one on the back substrate and the display side substrate or the case in which they are disposed on, or as, the partition walls is more advantageous than the case in which the two are disposed on only any one of the both substrates.

Figure 4A:
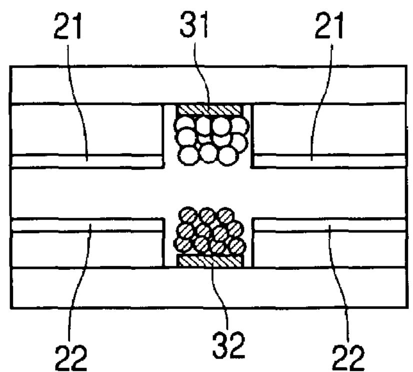
FIGS. 4A and 4B are cross sectional views showing variations of the structure of the unit cell.
Figure 4B:
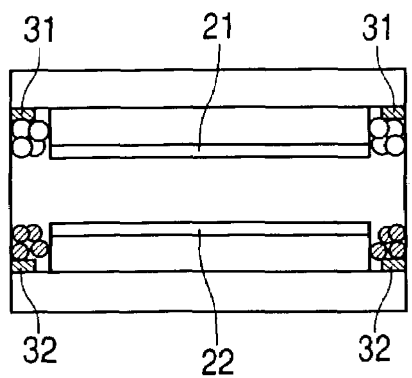

The collection electrodes may be disposed at recessed portions (FIGS. 4A and 4B). In this case, there is an advantage that the colored electrophoretic particles that can be held on the collection electrodes can be in a larger number to enhance the open area ratio. Also, the number of the first collection electrode and second collection electrode each is by no means limited to one, and a plurality of collection electrodes may be provided on the back substrate and/or the display side substrate.

Figure 5A:
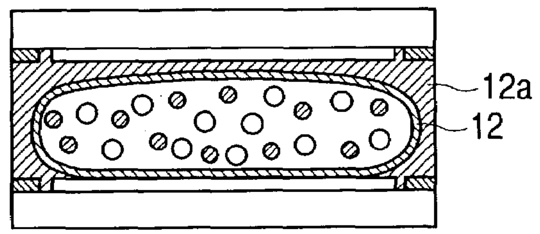
FIGS. 5A, 5B and 5C are cross sectional views showing variations of the structure of the unit cell.
Figure 5B:
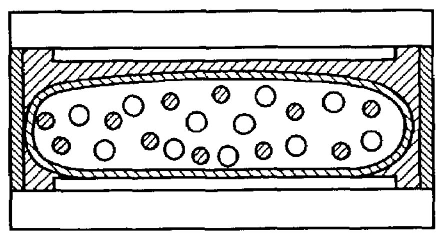
Figure 5C:
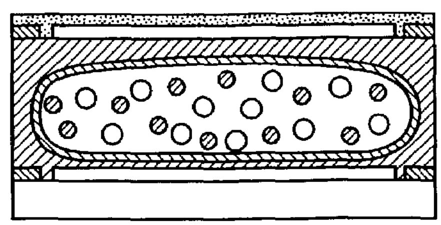

Encapsulation (placement in microcapsules) of the colored electrophoretic particles in unit cells is also one of preferred embodiments. As show in FIGS. 5A to 5C, each transparent microcapsule 12 having enclosed two kinds of particles and an electrophoretic liquid is disposed in the state it has been made flat. FIG. 5A shows an example in which, between substrates having the electrode construction shown in FIG. 2B, the air space between the both electrodes and the microcapsule 12 is filled with a transparent resin binder 12*a*, in the state of which the microcapsule is pressed with both the electrodes to make it flat, followed by curing the resin binder 12*a* to fix the microcapsules in a flat shape. As the resin binder, it is preferable to use an ultraviolet curable resin or a heat curable resin. FIG. 5B shows an example in which the microcapsules are fixed in the same manner but between substrates having the electrode construction shown in FIG. 3B. FIG. 5C shows an example in which the display side substrate has been omitted in the electrode construction shown in FIG. 2B. The top surface of the resin binder with which the microcapsule is fixed may be made flat and the electrode and an insulating layer may directly be formed on the flattened surface, provided that the electrode is formed by a low temperature process which does not require any vacuum treatment, such as the printing of organic conductive films.

There are no particular limitations on the plane shape of pixels, which may include any shape as exemplified by polygons such as squares, rectangles and hexagons, and circles.

(How to Drive Unit Cell)

How to drive the unit cells and how the display is performed are described with reference to FIGS. 6A to 6F. The most important feature in the driving method in the present invention lies in that a first state in which the two kinds of colored electrophoretic particles are both attracted to the two collection electrodes (FIG. 6B), a second state in which only first particles of the two kinds of colored electrophoretic particles are attracted to the first display electrode (FIG. 6C), a third state in which only second colored electrophoretic particles are attracted to the second display electrode (FIG. 6D), a fourth state in which the two kinds of colored electrophoretic particles are both attracted to the two display electrodes (FIG. 6E) and a state intermediate between these four states (FIG. 6F) can be formed.

The respective colored electrophoretic particles are translucent polymer particles containing desired dye molecules. In what is shown in these drawings, the first colored electrophoretic particles of the two kinds of colored electrophoretic particles are assumed to be negatively charged and the second colored electrophoretic particles to be positively charged.

Figure 6A:
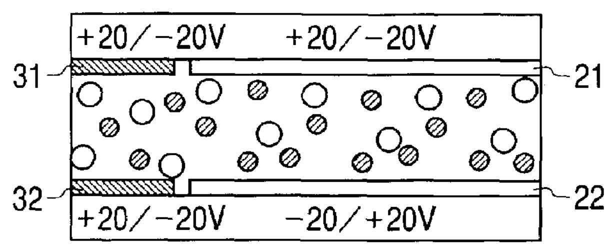
FIGS. 6A, 6B, 6C, 6D, 6E and 6F illustrate a method of driving the unit cell.
Figure 6B:
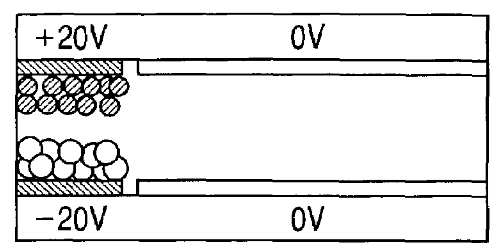
Figure 6C:
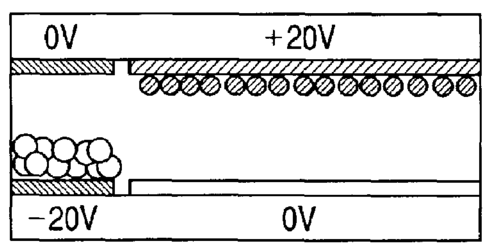
Figure 6D:
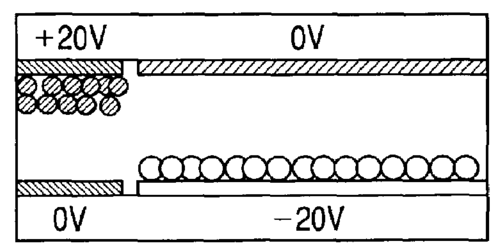
Figure 6E:
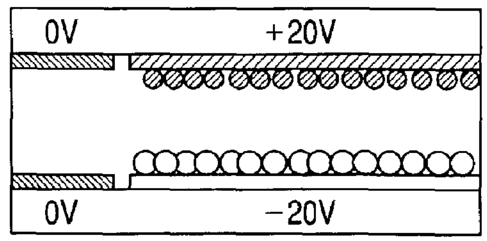

Before the display is performed, it is reset to be initialized (FIG. 6A). Same phase continuous rectangular waves of 100

Hz and ±20 V are applied to the first collection electrode 31 and second collection electrode 32. On the other hand, reversed phase continuous rectangular waves of 100 Hz and ±20 V are applied to the first display electrode 21 and second display electrode 22. Thus, a state is formed in which the two kinds of colored electrophoretic particles stand dispersed uniformly in the cell.

To form the first state (FIG. 6B), after the display has been reset to be initialized, all electrode potentials are first returned to 0 V, and then, keeping the first display electrode and second display electrode at 0 V, a rectangular pulse of +20 V and 100 ms is applied to the first collection electrode, and a rectangular pulse of −20 V and 100 ms to the second collection electrode. The first colored electrophoretic particles having negative charge all collect to the first collection electrode, and on the other hand the second colored electrophoretic particles having positive charge all collect to the second collection electrode, so that the transparent display electrode surface come uncovered.

To form the second state (FIG. 6C), after the display has been reset to be initialized, all electrode potentials are first returned to 0 V, and then, keeping the second display electrode and first collection electrode at 0 V, a rectangular pulse of +20 V and 100 ms is applied to the first display electrode, and a rectangular pulse of −20 V and 100 ms to the second collection electrode. The second colored electrophoretic particles having positive charge all collect to the second collection electrode disposed at the light screening area, and on the other hand the first colored electrophoretic particles having negative charge form a particle layer on the first display electrode which affords a display area.

To form the third state (FIG. 6D), after the display has been reset to be initialized, all electrode potentials are first returned to 0 V, and then, keeping the first display electrode and second collection electrode at 0 V, a rectangular pulse of −20 V and 100 ms is applied to the second display electrode, and a rectangular pulse of +20 V and 100 ms to the first collection electrode. The first colored electrophoretic particles having negative charge all collect to the first collection electrode disposed at the light screening area, and on the other hand the second colored electrophoretic particles having positive charge form a particle layer on the second display electrode which affords a display area.

To form the fourth state (FIG. 6E), after the display has been reset to be initialized, all electrode potentials are first returned to 0 V, and then, keeping the first collection electrode and second collection electrode at 0 V, a rectangular pulse of +20 V and 100 ms is applied to the first display electrode., and a rectangular pulse of −20 V and 100 ms to the second display electrode. The first colored electrophoretic particles-having negative charge form a particle layer on the first display electrode, and on the other hand the second colored electrophoretic particles having positive charge form a particle layer on the second display electrode.

Figure 6F:
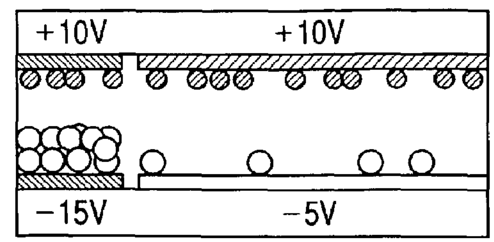
Figure 7A:
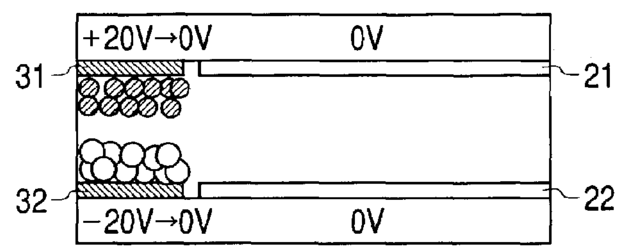
FIGS. 7A, 7B, 7C, 7D, 7E and 7F illustrate another method of driving the unit cell.
Figure 7B:
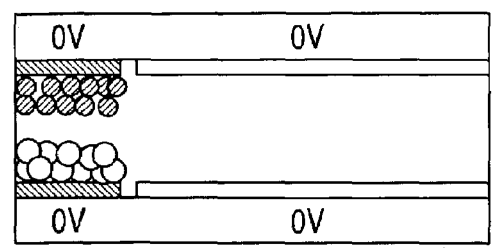
Figure 7C:
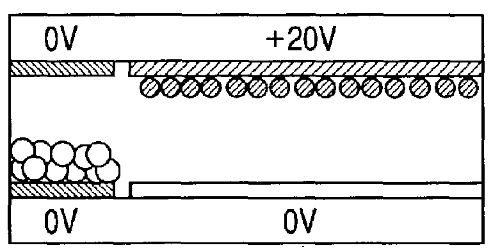
Figure 7D:
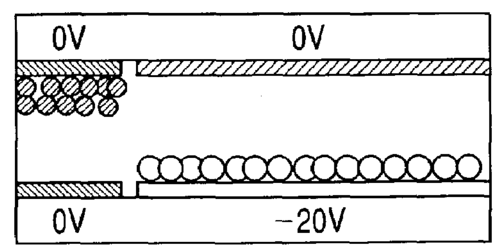
Figure 7E:
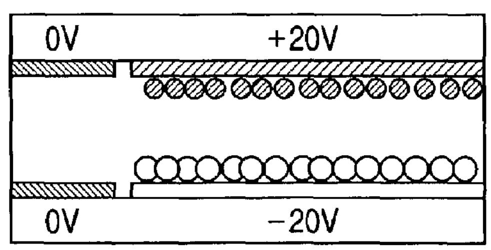
Figure 7F:
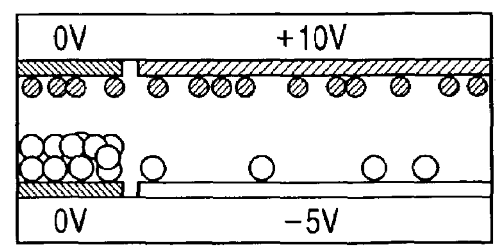

The state intermediate between these first to fourth states can also be formed (FIG. 6F). For example, after the display has been reset to be initialized, all electrode potentials are first returned to 0 V, and then, a rectangular pulse of +10 V and 100 ms is applied to the first display electrode, a rectangular pulse of +10 V and 100 ms to the first collection electrode, a rectangular pulse of −5 V and 100 ms to the second display electrode, and a rectangular pulse of −15 V and 100 ms to the second collection electrode. Some of the first colored electrophoretic particles having negative charge collect on the first collection electrode, and the remaining first colored electrophoretic particles come dispersed on the first display electrode. On the other hand, some of the second colored electrophoretic particles having positive charge collect on the second collection electrode, and the remaining second colored electrophoretic particles come dispersed on the second display electrode.

In the drawings, the particles are drawn in a large size for convenience of description. Accordingly, the particles are so drawn that, in the second to fourth states, in which all the particles move to the display electrode(s), only one particle layer is formed over the whole area(s) of the display electrode(s), and, in the intermediate state, the particle layers are formed only some part on the display electrodes. However, more preferably the particle size is far smaller than the unit cell size, and it is preferable to be so made that, in the second to fourth states, particle layers constituting a multiple layer are formed over the whole area(s) of the display electrode(s), and, in the intermediate state, the modulation intensity is controlled by the thickness of the layers formed.

It is not necessarily the case that the initial reset state is limited to the particle dispersed state. For example, the first state (FIG. 6B) or the fourth state (FIG. 6E) may be set as the initial reset state. Of course, the conditions for voltage application to each state change depending on the reset state. In the foregoing description, the potentials of all the two display electrodes and two collection electrodes are changed. Where unit cells are arranged in a matrix and driven, it is preferable that the two of the four electrodes are set as common electrodes so that the number of electrodes controlled independently for each pixel can be reduced. An example thereof is shown in FIGS. 7A to 7F. The first collection electrode 31 and second collection electrode 32 are set as common electrodes. First, the display is brought to the initial reset state to form an initial state (FIG. 7A), and thereafter all the electrodes are set to 0 V. In the writing, in the state the common electrodes two collection electrodes are fixed to 0V, a desired voltage is applied to the first display electrode 21 and second collection electrode 22, whereby a first state to a fourth state (FIGS. 7B to 7E) and an intermediate state of these (FIG. 7F) can be formed.

(Pixel Structure and Display Method for Color Display)

A remarkable feature in the color display method in the present invention lies in that display colors are formed by subtractive mixture of color stimuli where the incident light is stepwise modulated by the aid of a plurality of light absorption layers having different wavelength characteristics. The subtractive mixture of color stimuli is a color display system used widely in printing mediums, and a quality level of bright and broad color space display can be expected. In particular, color representation having a broad color space is known to be obtainable by subtractive mixture of color stimuli by the aid of light absorption layers which are variable in three light absorptions for yellow (Y), magenta (M) and cyan (C).

In order to materialize color display by the subtractive mixture of color stimuli, in the present invention the unit cells having been described are combined to make up each pixel having a plurality of display electrodes which look one upon another from the observer side. The colored electrophoretic particles (some of them) used in the present invention are translucent colored particles, and the quantity of these translucent colored particles to be dispersed on each display electrode surface is changed so that each display electrode can function as a light absorption layer of variable wavelength to enable the subtractive mixture of color stimuli. Incidentally, though not particularly made explicit in the following description, a white scattering layer is disposed at the upper part or lower part of the display electrode provided on the cell back substrate when the present invention is applied in reflection type display devices, and a white light source is disposed when applied in transmission type display devices.

A color display method is described below in respect of a typical pixel structure in the present invention.

Figure 8B:
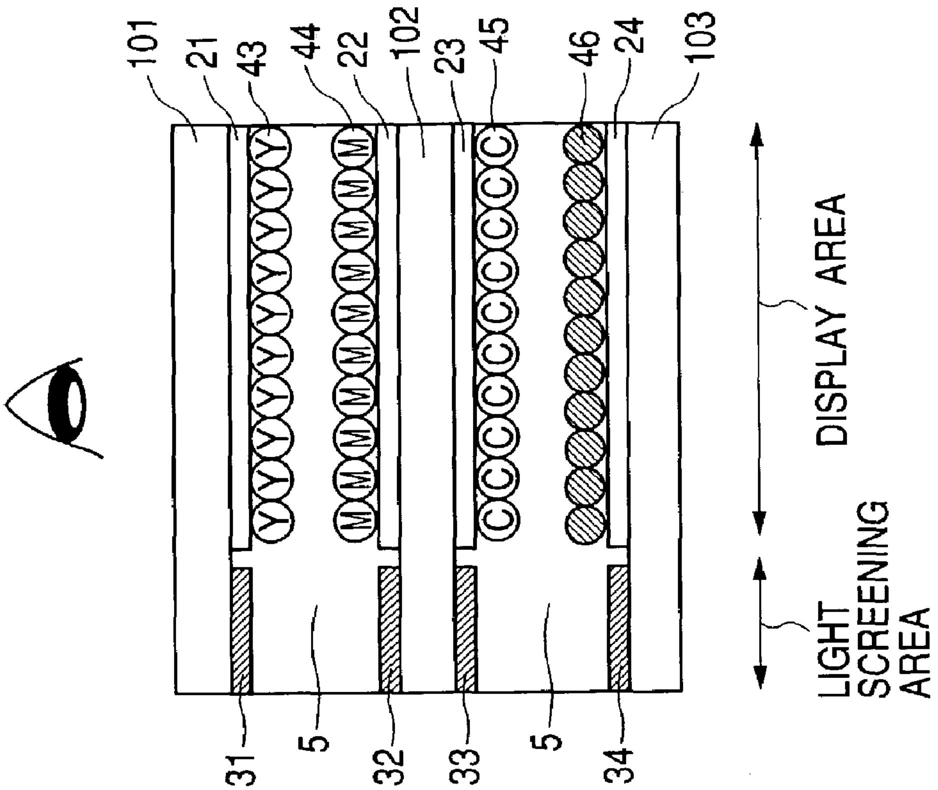
FIGS. 8A and 8B are cross sectional views of pixel structures of a stacked disposition type.
Figure 8A:
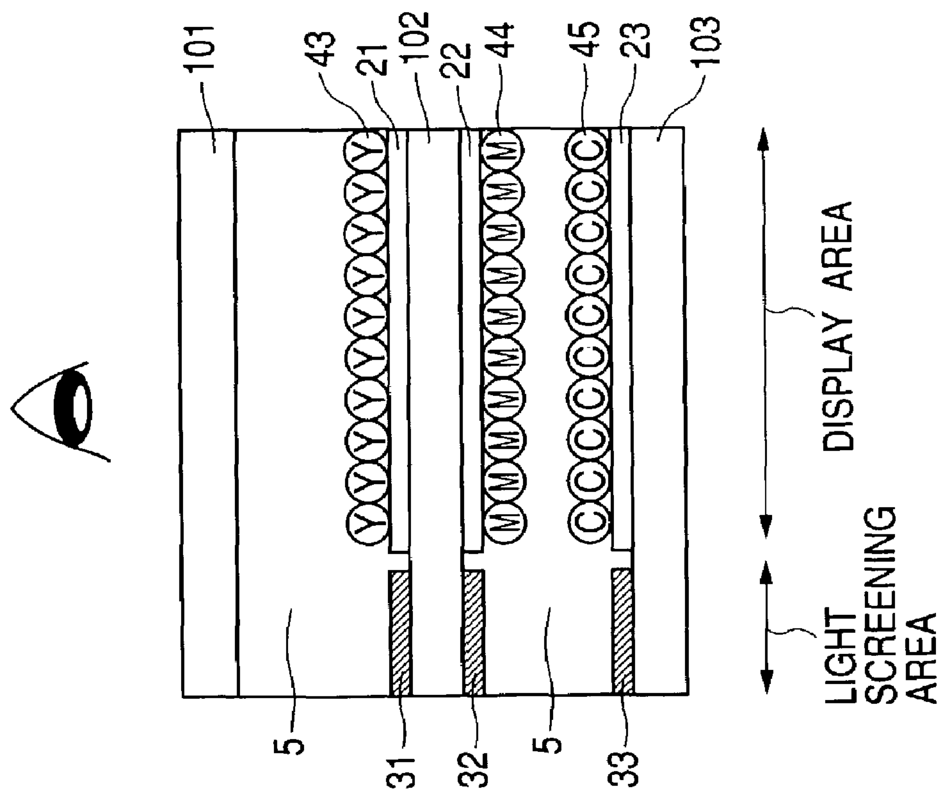
Figure 9A:
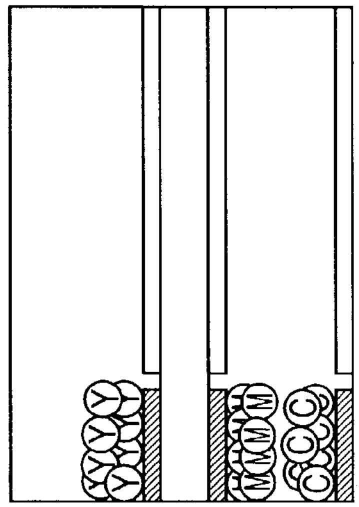
FIGS. 9A, 9B, 9C and 9D illustrate a color display method in the pixel of a stacked disposition type.
Figure 9B:
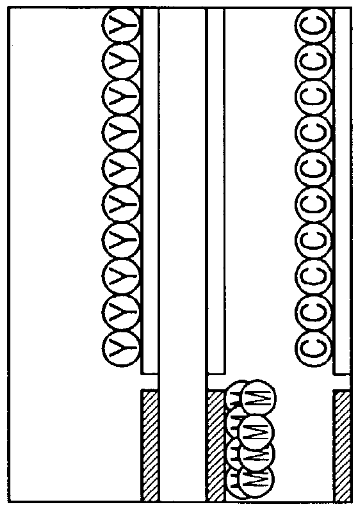
Figure 9C:
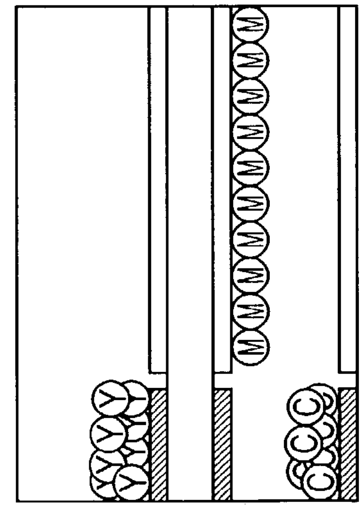
Figure 9D:
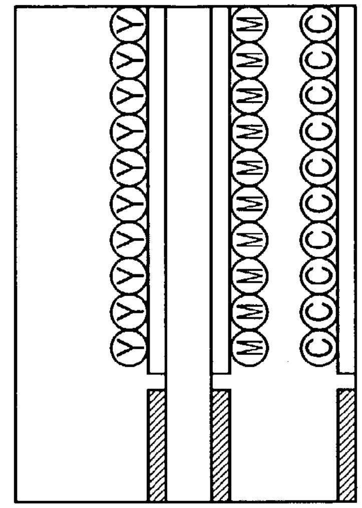

FIGS. 8A and 8B show the most typical examples in the present invention, where two unit cells are disposed in a stack to make up each pixel.

In the example shown in FIG. 8A, a unit cell II which is original in the present invention as described with reference to FIG. 1 is disposed at the lower stage, and a conventional type unit cell I consisting of one kind of colored electrophoretic particles, one display electrode and one collection electrode is disposed at the upper stage. Not shown in the drawings, two unit cells may be stacked where the display electrode is one layer in each unit cell, i.e., two unit cells I may be disposed in a stack.

When the two cells are disposed in a stack, the back substrate of the upper stage cell may be bonded to the display side substrate of the lower stage cell. However, from the viewpoint of controlling a parallax, the back substrate of the upper stage cell and the display side substrate of the lower stage cell may more preferably be used in common, using the same substrate (intermediate substrate). In the following, the display side substrate in the stacked structure is called a first substrate 101, the intermediate substrate a second substrate 102, and the back substrate a third substrate 103. With regard to display electrodes, they are called a first display electrode 21, a second display electrode 22 and a third display electrode 23 in the order from the display side substrate side toward the back substrate side. With regard to collection electrodes as well, they are called likewise a first collection electrode 31, a second collection electrode 32 and a third collection electrode 33. The first display electrode 21, second display electrode 22 and third display electrode 23 are disposed at a position where they lie substantially one upon another as viewed from the observer side. The upper stage cell and the lower stage cell are filled with insulating liquids 5 in which yellow positively charged particles 43 as first colored electrophoretic particles, and magenta positively charged particles 44 as second colored electrophoretic particles and cyan negatively charged particles 45 as third colored electrophoretic particles, respectively, stand dispersed therein.

FIG. 8B shows another typical example in the two layer stacked structure, in which the unit cell II which is original in the present invention as described with reference to FIG. 1 is disposed at both the upper and lower stages in a stack. Two sets of drive electrodes consisting of four display electrodes 21 to 24 and four collection electrodes 31 to 34 and four kinds of colored electrophoretic particles 43 to 46 make up each pixel. The upper stage cell and the lower stage cell are filled with insulating liquids 5 in which yellow positively charged particles 43 as first colored electrophoretic particles and magenta negatively charged particles 44 as second colored electrophoretic particles, and cyan negatively charged particles 45 as third colored electrophoretic particles and black negatively charged particles 46 as fourth colored electrophoretic particles, respectively, stand dispersed therein.

A color display method in the pixel structure shown in FIG. 8A is described below with reference to FIGS. 9A to 9D. In the case of white display (FIG. 9A), all kinds of colored electrophoretic particles are collected to collection electrodes, and display electrodes are all made uncovered. Any absorption at the respective display electrodes is not effected, and hence white incident light is transmitted through the unit cells without being modulated.

In the case of monochrome (red, green or blue) display (FIG. 9B), only electrophoretic particles with a color standing a complementary color to the desired monochrome are collected to a collection electrode, and the other two kinds of colored electrophoretic particles are arranged on display electrodes to form light absorption layers. For example, in the case of green display, second colored electrophoretic particles with magenta color which is complementary color of green are collected to the second collection electrode, and the yellow first colored electrophoretic particles and cyan third colored electrophoretic particles are arranged on the first display electrode and the third display electrode, respectively. White incident light turns to green light by the principal of subtractive mixture of color stimuli as a result that the blue component is absorbed at the first display electrode and further the red component is absorbed at the third display electrode.

In the case of complementary color (yellow, magenta or cyan) display (FIG. 9C), only electrophoretic particles with the desired complementary color are arranged on a display electrode, and the other two kinds of colored electrophoretic particles are collected to collection electrodes. For example, in the case of magenta display, only magenta second colored electrophoretic particles are arranged on the second collection electrode, and the yellow first colored electrophoretic particles and cyan third colored electrophoretic particles are collected to the first collection electrode and the third collection electrode, respectively. White incident light turns to magenta as a result that the green component is absorbed at the second display electrode.

In the case of black display (FIG. 9D), all kinds of colored electrophoretic particles are arranged on display electrodes to form light absorption layers. As to the white incident light, all components of incident light are absorbed as a result that the blue component, the green component and the red component are absorbed at the first display electrode, at the second display electrode and at the third display electrode, respectively.

The reflectance (%) of each of white, monochrome, complementary color and black in the present embodiment is shown in Table 1. In the display described above, the theoretical reflectance having disregarded open area ratio loss and transparent electrode (ITO) absorption is 100% in white display, 33% in monochrome display, 66% in complementary color display and 0% in black display. Thus, ideal display characteristics are obtained which are just like the subtractive mixture of color stimuli, which can utilize the whole display area in a good efficiency. In respect of the effective reflectance taking account of open area ratio loss and transparent electrode (ITO) absorption as well, display characteristics having superiority to conventional examples and being well balanced can be achieved.

Black display characteristics are supplemented. Wavelength characteristics of practical yellow, magenta and cyan dyes overlap at boundary regions, and hence it is anticipated that the black display device comes week a little in the structure shown in FIG. 8A, which performs black display by absorbing the three layers of these. In the structure shown in FIG. 8B, the black display can be strengthened by providing a black absorption layer in addition to these three layers.

Another typical pixel structure in the present invention and its color display method are described below with reference to FIGS. 10 to FIGS. 13A to 13D.

Figure 10:
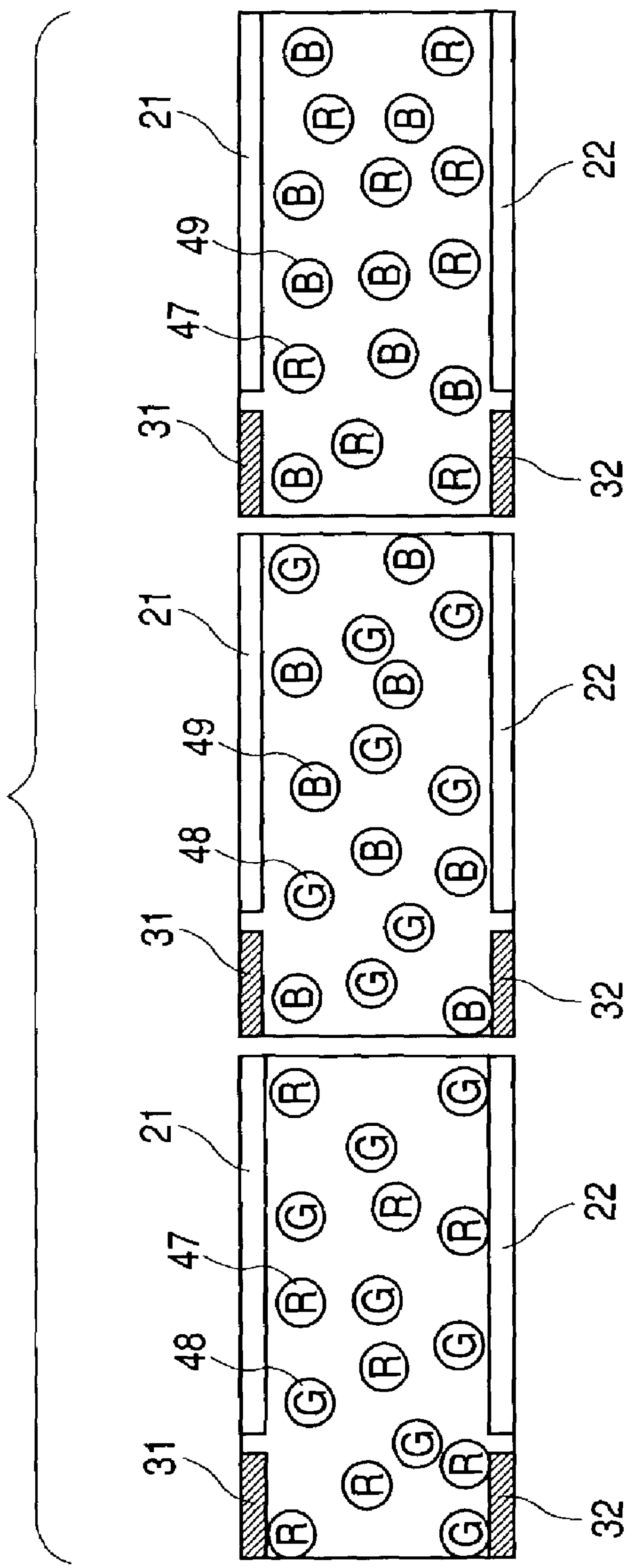
FIG. 10 is a cross sectional view of a pixel structure of a parallel disposition type in its first example.
Figure 11A:
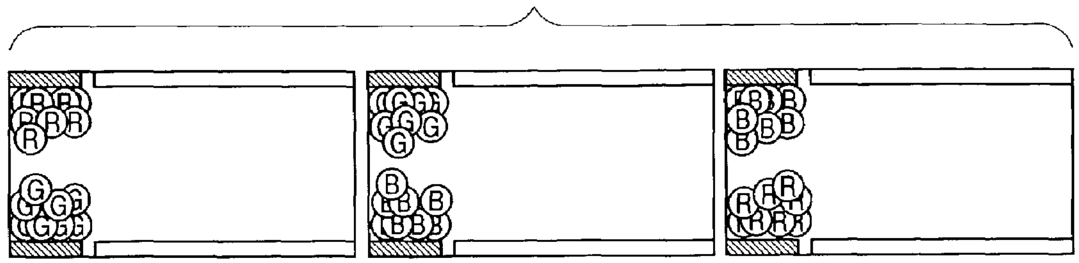
FIGS. 11A, 11B, 11C and 11D illustrate a color display method in the second example of the pixel structure of a parallel disposition type.
Figure 11B:
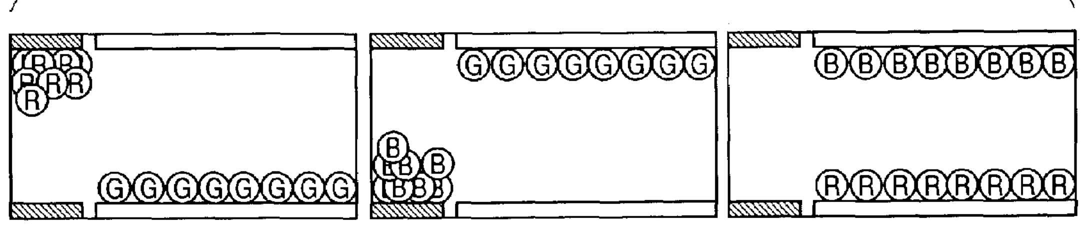
Figure 11C:
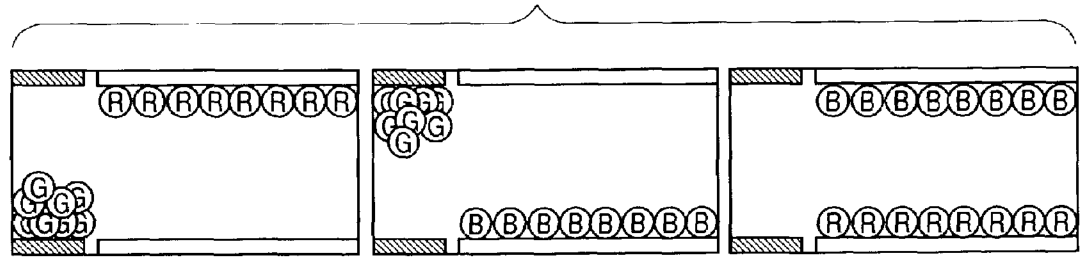
Figure 11D:
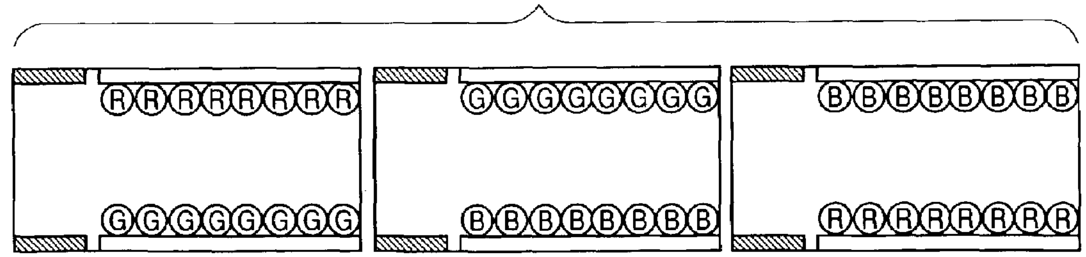

FIG. 10 shows a schematic cross sectional view of the pixel structure. The unit cell II which is original in the present invention as described with reference to FIG. 1 is used in three which are disposed in parallel to make up each pixel. In the following, these are called a first cell, a second cell and a third cell in the order from the left cell. A first display electrode 21 and a first collection electrode 31 are disposed on the display side substrate side in each cell, and a second display electrode 22 and a second collection electrode 32 on the back substrate side in each cell. The first display electrode 21 and second display electrode 22 are disposed at a position where they lie substantially one upon another as viewed from the observer side. In the structure shown in this drawing, the first cell, the second cell and the third cell are filled with electrophoretic liquids in which red positively charged particles 47 and green negatively charged particles 48, green positively charged particles 48 and blue negatively charged particles 49, and blue positively charged particles 49 and red negatively charged particles 47, respectively, stand dispersed therein.

A color display method in the pixel structure shown in FIG. 10 is described below with reference to FIGS. 11A to 11D. In the case of white display (FIG. 11A), all kinds of colored electrophoretic particles are collected to collection electrodes, and display electrodes are all made uncovered. Any absorption at the respective display electrodes is not effected, and hence white incident light is transmitted through the unit cells without being modulated.

In the case of monochrome (red, green or blue) display (FIG. 11B), only the desired monochrome particles are arranged on display electrodes in two cells to display a monochrome, and, in a cell not containing the desired monochrome particles, two kinds of particles are both arranged on display electrodes. For example, in the case of green display, in the first cell and second cell the green particles are arranged on the second display electrode and the first display electrode, respectively, to form light absorption layers, and the other particles are collected to the first collection electrode and the second collection electrode, respectively. In the third cell, both the blue particles and the red particles are arranged on the first display electrode and the second display electrode, respectively, to form light absorption layers. White incident light turns to green light in the first cell and second cell, and in the meantime, in the third cell, turns to black by the subtractive mixture of color stimuli as a result that the red component and green component are first absorbed at the first display electrode and then the blue component is absorbed at the second display electrode. It turns to green light by the additive mixture of color stimuli of modulated light in virtue of these three cells.

In the case of complementary color (yellow, magenta or cyan) display (FIG. 11C), monochrome particles not containing the desired complementary color component are collected to collection electrode in two cells, and, in another cell, two kinds of monochrome particles containing the complementary color component are both arranged on display electrodes. For example, in the case of magenta display, in the first cell and second cell the green particles are collected to the second collection electrode and the first collection electrode, respectively. In the meantime, the red particles and green particles are arranged on the first display electrode and the second display electrode, respectively, to form light absorption layers. In the third cell, both the blue particles and the red particles are arranged on the first display electrode and the second display electrode, respectively, to form light absorption layers. White incident light turns to red light in the first cell and blue light in the second cell, and in the meantime, in the third cell, turns to black by the subtractive mixture of color stimuli as a result that the red component and green component are first absorbed at the first display electrode and then the blue component is absorbed at the second display electrode. It turns to magenta light by the additive mixture of color stimuli of modulated light in virtue of these three cells.

In the case of black display (FIG. 11D), all kinds of colored electrophoretic particles are arranged on display electrodes to form light absorption layers. The white incident light passes through the two light absorption layers formed on the first display electrode and second display electrode in each cell, and hence turns to black by the subtractive mixture of color stimuli.

In the foregoing description, in respect of the third cells in the monochrome display and complementary color display, two kinds of colored electrophoretic particles may both be collected to the collection electrodes. In this case, the white light component is superimposed on the emergent light, and hence brighter display can be obtained.

The reflectance (%) of each of white, monochrome, complementary color and black in the present embodiment is shown in Table 1. The theoretical reflectance having disregarded open area ratio loss and transparent electrode (ITO) absorption is 100% in white display, 22% in monochrome display, 22% in complementary color display and 0% in black display in the case when the third cells in the monochrome display and complementary color display are made to perform black display, and 100% in white display, 22 (33) % in monochrome display, 22 (33) % in complementary color display and 0% in black display in the case when the third cells in the monochrome display and complementary color display are made to perform white display (numerical values in parentheses are those of the reflectance component of white light superimposed). Though inferior to the stacked disposition type structure, display characteristics having superiority to conventional examples and being well balanced can be achieved.

Figure 12:
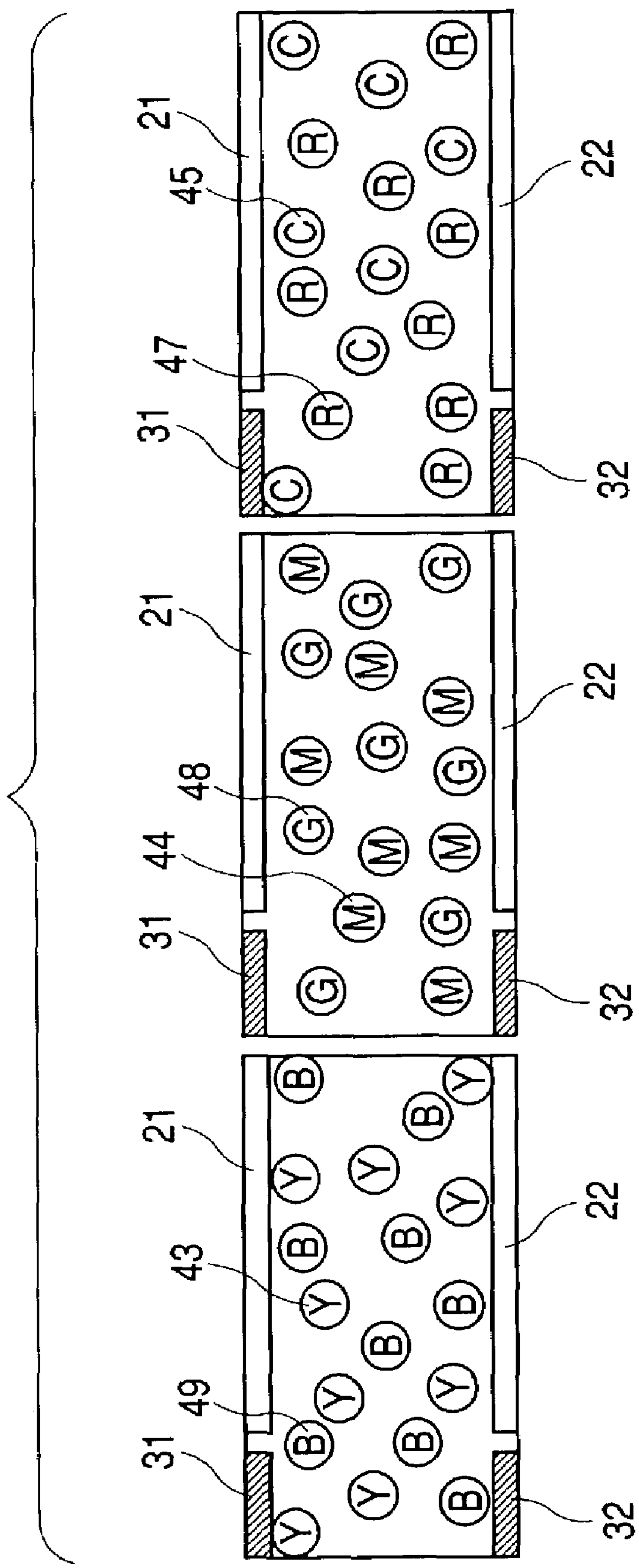
FIG. 12 is a cross sectional view of the pixel structure of a parallel disposition type in its second example.
Figure 13A:
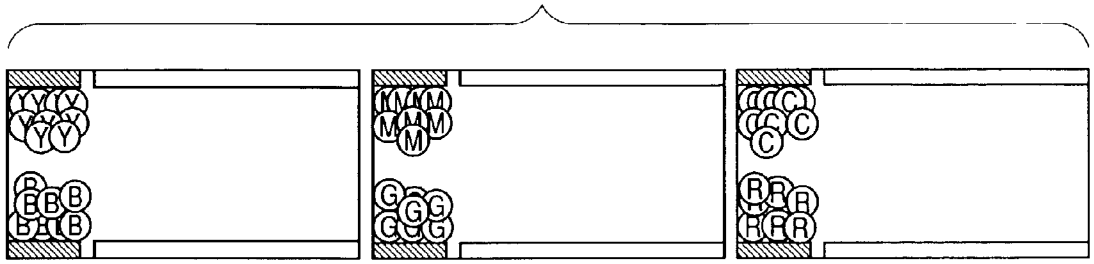
FIGS. 13A, 13B, 13C and 13D illustrate a color display method in the second example of the pixel structure of a parallel disposition type.
Figure 13B:
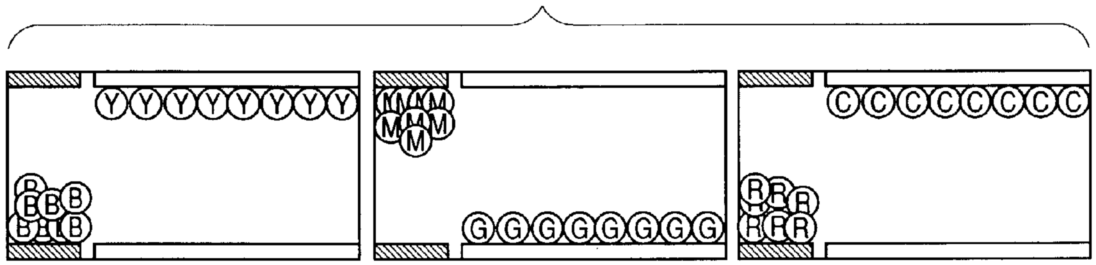
Figure 13C:
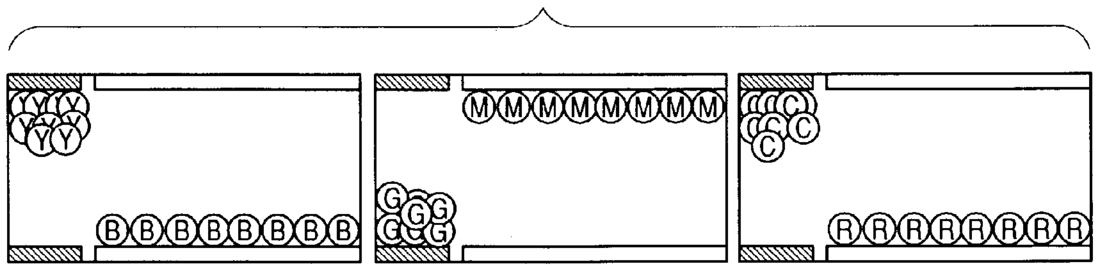
Figure 13D:
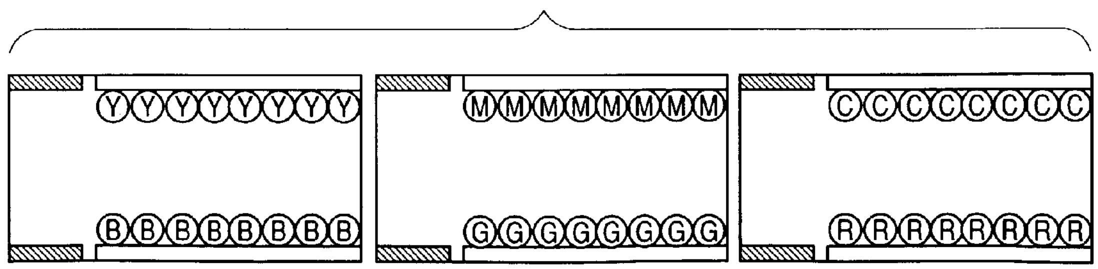

Then, FIG. 12 shows another pixel structure in parallel disposition. In the structure shown in this drawing, the colors of two kinds of particles in each cell mutually stand a complementary color. The first cell, the second cell and the third cell are filled with insulating liquids in which yellow positively charged particles 43 and blue negatively charged particles 49, magenta positively charged particles 44 and green negatively charged particles 48, and cyan positively charged particles 45 and red negatively charged particles 47, respectively, stand dispersed therein.

A color display method in the pixel structure shown in FIG. 12 is described below with reference to FIGS. 13A to 13D. In the case of white display (FIG. 13A), all kinds of colored electrophoretic particles are collected to collection electrodes, and display electrodes are all made uncovered. Any absorption at the respective display electrodes is not effected, and hence white incident light is transmitted through the unit cells without being modulated.

In the case of monochrome (red, green or blue) display (FIG. 13B), only the desired monochrome particles are arranged on display electrodes in one cell containing the desired monochrome particles, and, in the other two cells, only complementary color particles containing the desired monochrome component are arranged on display electrodes. For example, in the case of green display, in the second cell the green particles are arranged on the second display electrode to form a light absorption layer, and the other particles are collected to the first collection electrode. In the first cell and third cell, the yellow particles and cyan particles having the green component are arranged on the first display electrodes to form light absorption layers. In the meantime, the blue particles and red particles are collected to the second collection electrodes. White incident light turns to green light in the second cell, yellow in the first cell and cyan in the third cell, and turns to green light by the additive mixture of color stimuli of modulated light in virtue of these three cells.

In the case of complementary color (yellow, magenta or cyan) display (FIG. 13C), only desired complementary color particles are arranged on a display electrode in one cell containing the desired complementary color particles to form a light absorption layer, and, in the other two cells, only monochrome particles coming to the desired complementary color component are collected on display electrodes. For example, in the case of magenta display, in the second cell the magenta particles are arranged on the first display electrode, and the other colored electrophoretic particles are collected to the second collection electrode. In the first and third cell, the blue particles and red particles which are monochrome components of magenta are arranged on the second display electrodes to form light absorption layers. In the meantime, the yellow particles and the cyan particles are collected to the first collection electrodes. White incident light turns to magenta in the second cell, blue in the first cell and red in the third cell, and turns to magenta light by the additive mixture of color stimuli of modulated light in virtue of these three cells.

In the case of black display (FIG. 13D), all kinds of colored electrophoretic particles are arranged on display electrodes to form light absorption layers. The white incident light passes through the two light absorption layers formed on the first display electrode and second display electrode in each cell, and hence turns to black by the subtractive mixture of color stimuli.

The reflectance (%) of each of white, monochrome, complementary color and black in the present embodiment is shown in Table 1. The theoretical reflectance having disregarded open area ratio loss and transparent electrode (ITO) absorption is 100% in white display, 22 (33) % in monochrome display, 44% in complementary color display and 0% in black display in the case when the third cells in the monochrome display and complementary color display are made to perform black display (numerical values in parentheses are those of the reflectance component of white light superimposed). Though inferior to the stacked disposition type structure, display characteristics having superiority to conventional examples and being well balanced can be achieved.

(Component Members and Their Formation Methods)

For the substrates, usable are plastic films formed of polyethylene terephthalate (PET), polycarbonate (PC) or polyether sulfone (PES), as well as quartz and glass. For the display side substrate, a transparent material must be used. For the back substrate, however, a colored material such as polyimide (PI) may be used.

As electrode materials, any materials may be used as long as they are conductive materials which can be patterned. As display electrode materials, usable are transparent electrode materials including inorganic materials such as indium tin oxide (ITO), organic materials such as PEDOT (trade name; available from AGFA Co.). As collection electrode materials and back substrate side display electrode materials, usable are, e.g., metals such as chromium (Cr), titanium (Ti), aluminum (Al) and copper (Cu), carbon, and silver paste, as well as organic conductive films. Where the display electrode on the back substrate side is used also as a light reflection layer, a material with a high reflectance such as silver (Ag) or aluminum (Al) may preferably be used. Where this display electrode is used as a white display electrode, the electrode surface itself is made to have surface unevenness so that the light may reflect irregularly, or a light scattering layer is beforehand formed on the electrode.

As materials for the insulating layer, usable are materials which are thin film and can not easily form pinholes and have a low dielectric constant, as exemplified by amorphous fluorine resins, highly transparent polyimide resins, PET, acrylic resins and epoxy resins. The insulating layer may preferably have a layer thickness of approximately from 10 nm to 1 μm.

As materials for the partition walls, polymer resins may be used. The partition walls may be formed by any methods. For example, usable are a method in which a photosensitive resin layer formed of acrylic resin or the like is formed on one substrate by coating, followed by exposure and wet process development; a method in which partition walls separately formed are bonded to the substrate; a method in which partition walls are formed by printing; and a method in which partition walls are previously formed on the surface of a light transmissive substrate by molding. Where the partition walls themselves are made up of a conductive material to serve as collection electrodes, electrolytic plating, resin molding or the like may be used. As methods of forming insulating layers on such conductive partition wall surfaces, usable are, e.g., a method in which the electrode surfaces are oxidized by anodization, and a method in which the electrode surfaces are coated with a resin by electrodeposition resist coating.

As the electrophoretic liquid, usable are aromatic hydrocarbon solvents such as benzene, toluene, xylene, and naphthene type hydrocarbons; aliphatic hydrocarbon solvents such as hexane, cyclohexane, kerosene, paraffin type hydrocarbons and isoparaffin type hydrocarbons; and halogenated hydrocarbon solvents such as chloroform, trichloroethylene, dichloromethane, trichlorotrifluoroethylene and bromoethyl; as well as silicone oil and high purity petroleum. A solvent having a different specific gravity may also be added in order to adapt specific gravity to that of particles.

For the colored electrophoretic particles used in the present invention, any of inorganic materials, polymeric materials and composite particles of these may be used without any particular limitations as long as the scope of the present invention is satisfied. In the case when polymeric materials are used, usable are, but not limited to, e.g., polyacrylate resins, polymethacrylate resins, ethylene acrylic acid copolymer resins, phenol novolak type epoxy resins, cresol novolak type epoxy resins, cycloaliphatic epoxy resins, glycidyl ester epoxy resins, and polymethacrylic esters. The colored electrophoretic particles may preferably have a size of from 0.05 μm to 10 μm in particle diameter. The charge polarity of the colored electrophoretic particles is controlled by a charge control agent modified on particle component materials and/or particle surfaces.

The translucent colored electrophoretic particles may preferably be colored with a dye. As the dye, preferably usable are oil soluble dyes such as azo dyes, anthraquinone dyes, quinoline dyes, nitro dyes, nitroso dyes, perinone dyes, phthalocyanine dyes, metal complex salt dyes, naphthol dyes, benzoquinone dyes, cyanine dyes, indigo dyes and quinoneimine dyes. Any of these may also be used in combination.

The dye may specifically include, e.g., Varifast Yellow 1101, 1105, 3108, 4120; Oil Yellow 105, 107, 129, 3G, GGS; Varifast Red 1306, 1355, 2303, 3304, 3306, 3320; Oil Pink 312; Oil Scarlet 308; Oil Violet 730; Varifast Blue 1501, 1603, 1605, 1607, 2606, 2610, 3405; Oil Blue 2N, BOS, 613; Macrolex Blue RR; Sumiplast Green G; and Oil Green 520, BG. Where black particles or white particles are used, pigments such as titanium oxide, carbon black, Nigrosine and black iron oxide may be used.

As the charge control agent added to the electrophoretic liquid, usable are anionic surface active agent, cationic surface active agents, amphoteric surface active agents, metallic soaps, nonionic surface active agents, fluorine type surface active agents, block type copolymers, graft type copolymers, any of which may be used alone or in the form of a mixture of two or more. As specific examples, these may include sulfonated oil, alkyl phosphoric esters, imidosuccinates, cobalt naphthenate, zirconium naphthenate, zirconium octenoate, CALCIUM PETRONATE (available from Witco Corp.), lecithin, and OLOA 1200 (available from Chevron Corp.).

As described above, in the present invention, the pixel structure in which, as a preferred embodiment, the unit cells each having i) two display electrodes disposed at the position where they are substantially superimposed as viewed from the observer side, ii) two collection electrodes and iii) two kinds of translucent colored electrophoretic particles having charge polarities and colors which are different from each other are disposed in a stack or disposed in parallel makes it possible to display colors involving the principle of subtractive mixture of color stimuli in virtue of a plurality of variable light absorption layers and to provide an electrophoretic display device improved vastly in brightness and chroma.

The cell structure, cell fabrication process and driving method are described below in greater detail by giving Examples.

EXAMPLE 1

Figure 14A:
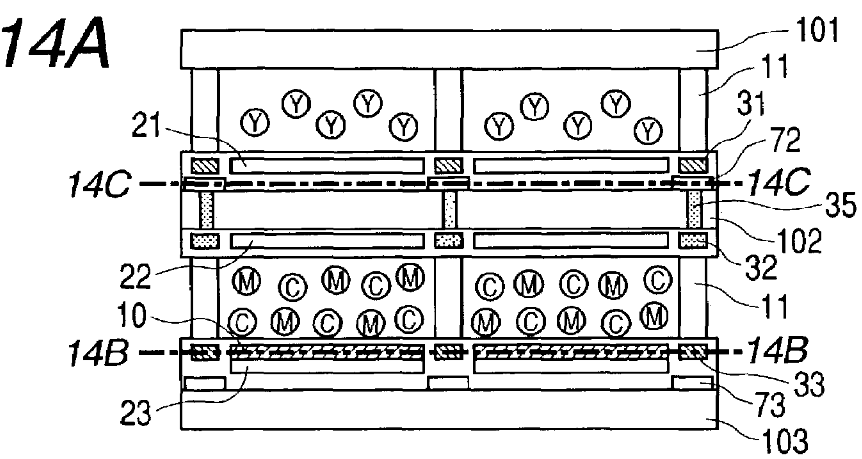
FIGS. 14A, 14B and 14C are structural views in Example 1 (stacked disposition type, type 1).
Figure 14B:
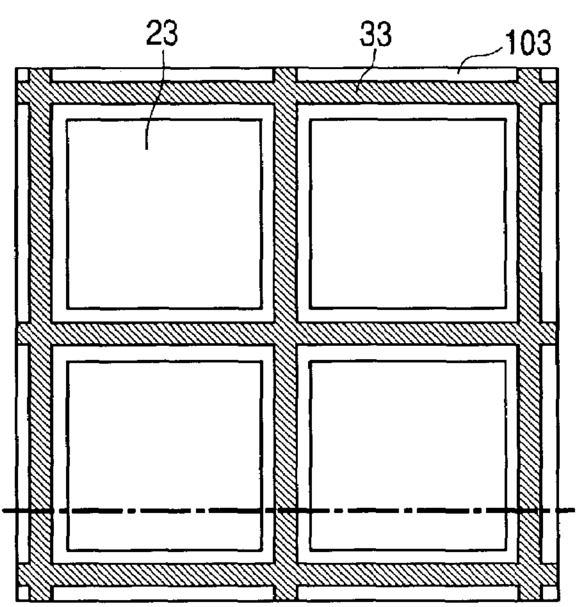
Figure 14C:
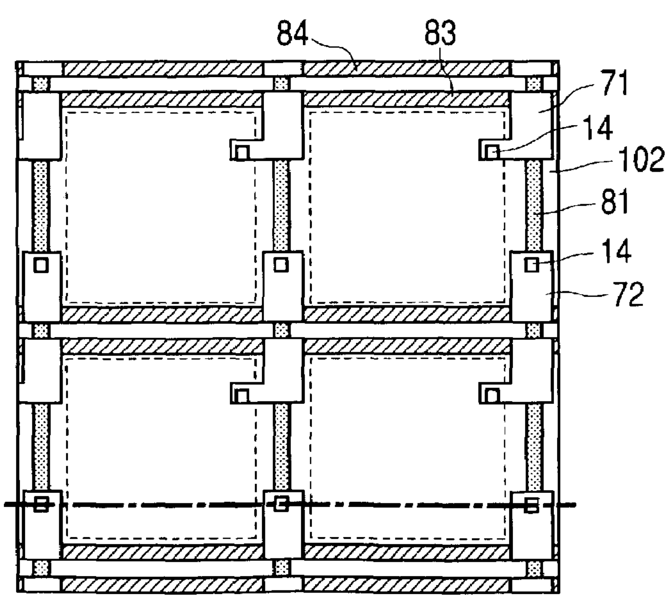

In this Example, described is an example of the structure, fabrication process and driving method of a color electrophoretic display-device in which pixels so structured that two unit cells are stacked (disposed in a stack) to constitute each pixel are arranged in a matrix. The display device to be fabricated have 100×100 pixels, and each pixel has a size of 200 μm×200 μm. FIGS. 14A to 14C present a cross sectional view (FIG. 14A) of areas corresponding to 2×2 pixels which are part of the display device, a plan view (FIG. 14B) along the line 14B-14B in FIG. 14A, and a plan view (FIG. 14C) along the line 14C-14C in FIG. 14A.

Partition walls 11 of 10 μm in width and 20 μm in height are disposed at pixel boundaries to divide the respective pixels and at the same time keep the distance between substrates constant. The unit cell structure in this Example corresponds to that shown in FIG. 2B. At the lower stage, a unit cell II containing an electrophoretic liquid in which two kinds of colored electrophoretic particles having different colors and charge characteristics have been dispersed, two display electrodes 22 and 23 and two collection electrodes 32 and 33 is disposed. At the upper stage, a unit cell I containing an electrophoretic liquid in which one kind of colored electrophoretic particles having a third color have been dispersed, one display electrode 21 and one collection electrode 31 is disposed.

The respective colored electrophoretic particles are translucent polymer particles colored with dyes. The charge polarity of the colored electrophoretic particles is controlled by the charge control agent modified on particle component polymer materials and on particle surfaces. In this Example, in the electrophoretic liquid in the upper stage unit cell and in that of the lower stage unit cell, yellow positively charged particles, and magenta negatively charged particles and cyan negatively charged particles, respectively, are dispersed. The particles all have an average particle diameter of 1 to 2 μm.

The substrates consist of a first substrate 101 serving as the display side substrate of the upper stage unit cell, a second substrate 102 serving as the back substrate of the upper stage unit cell and also as the display side substrate of the lower stage unit cell, and a third substrate 103 serving as the back substrate of the lower stage unit cell. The pixels are each square in planar shape. In each unit cell, a first display electrode 21 and a second display electrode 22 are disposed at the pixel middle areas on the surface (upper stage unit cell side) and back (lower stage unit cell side), respectively, of the second substrate 102; and a third display electrode 23, at the pixel middle area on the third substrate 103 (FIGS. 14A and 14B). Similarly, a first collection electrode 31 and a second collection electrode 32 are disposed at the pixel boundaries on the surface (upper stage unit cell side) and back (lower stage unit cell side), respectively, of the second substrate 102; and a third collection electrode 33, at the pixel boundaries on the third substrate 103.

The respective collection electrodes need not be insulated for each pixel, and are common electrodes to which adjoining pixels are mutually electrically conducted at each plane (FIG. 14B). On the other hand, the respective display electrodes are insulated for each pixel, and their potentials are independently controlled by a switching element connected for each display electrode. In this Example, for each cell, a first switching element 71 connected to the first display electrode 21 and a second,switching element 72 connected to the second display electrode 22 are disposed at the lower part of the first collection electrode 31 on the second substrate 102 surface (FIG. 14C). The first switching element 71 is connected to the first display electrode 21 through a contact hole, and the second switching element 72 is connected to the second display electrode 21 on the back of the second substrate 102 via a through electrode 35 provided in the second substrate 102. Similarly, a third switching element 73 connected to the third display electrode 23 is disposed at the lower part of the third collection electrode 33 on the second substrate 102 surface. The switching elements are FET type thin film transistors (TFTs), and control the potentials of display electrodes connected to drain electrodes by applying a desired voltage to signal lines connected to source electrodes and to scanning lines connected to drain electrodes.

A fabrication process for the electrophoretic display device according to this Example is described below with reference to FIGS. 15A to 15F.

Figure 15A:
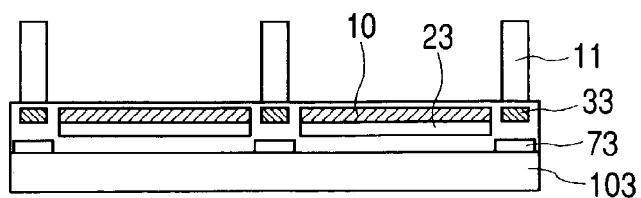
FIGS. 15A, 15B, 15C, 15D, 15E and 15F illustrate a cell fabrication process in Example 1 (stacked disposition type, type 1).

For the third substrate 103, a glass substrate of 1.1 mm in thickness is used. First, scanning electrode lines and gate electrodes are formed using Cr, then an SiN film is formed on the whole surface, thereafter, a-Si layer/$n^+$layer are formed to provide switching element areas, and then source electrodes, drain electrodes and signal electrode lines are successively formed (all not shown), followed by patterning to form third switching elements 73 (FIG. 14A), which are bottom gate type FETs. Then, these are covered with an insulating layer, and thereafter contact holes are made in the insulating layer. On this insulating layer, third display electrodes 23 are formed, and then connected to the drain electrodes of the third switching elements 73 through the contact holes. As a material for the third display electrodes 23, Al is used as having a high reflectance. The surfaces of the third display electrodes 23 are covered with acrylic resin layers (light scattering layers) 10 containing fine titanium oxide particles. In this Example, the third display electrodes 23 serve also as light reflection layers, and the acrylic resin layers 10 function as light scattering layers. Then, these layers are covered with a resin insulating layer, and thereafter third collection electrodes 33 are formed using Ti. Finally, partition walls 11 are formed using a thick film resist. (FIG. 15A; third substrate 103 unit).

Figure 15B:
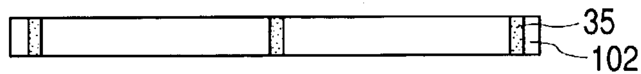

For the second substrate 102, a glass substrate of 0.1 mm in thickness is used. First, through holes of 20 μm in diameter are formed in the glass substrate by laser processing, and subsequently Al is formed in films on through hole inner walls by sputtering. Further, the interiors of the through holes are filled with a conductive paste to form through hole electrodes 35 (FIG. 15B). Then, in the same manner as those on the third substrate 103, scanning electrode lines 83 and 84, gate electrodes, SiN films, a-Si layer/$n^+$layer switching element areas, source electrodes, drain electrodes and a signal electrode line 81 are successively formed, followed by patterning to form first switching elements 71 and second switching elements 72 (FIG. 14C), which are bottom gate type FETs. In the course of this step, the through hole electrodes 35 are connected to the drain electrodes of the second switching elements 72.

Figure 15C:
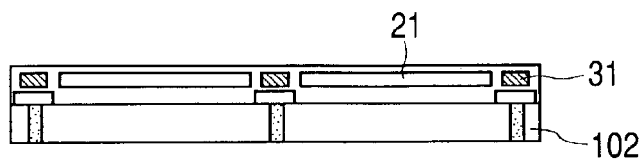

Next, an SiN insulating layer is formed on the switching elements, and thereafter contact holes 14 (FIG. 14C) are formed in the insulating layer. Subsequently, on this insulating layer, first display electrodes 21 formed of a transparent electrode material ITO are formed, and are connected to the drain electrodes of the first switching elements 71 via the contact holes 14. First collection electrodes 31 are further formed using Ti, and thereafter the whole area is covered with a resin insulating layer (FIG. 15C).

Figure 15D:
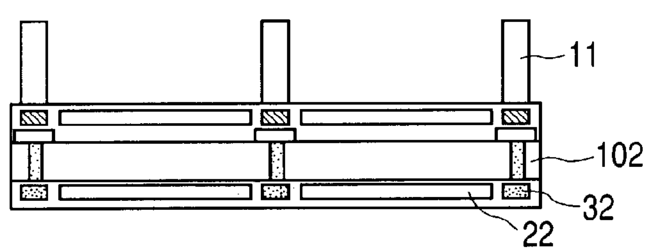

Next, on the back of the second substrate 102, second display electrodes 22 formed of a transparent electrode material ITO are formed, and are connected to the drain electrodes of the second switching elements 72 via the through hole electrodes 35. Second collection electrodes 32 are further formed using Ti, and thereafter the whole area is covered with a resin insulating layer. Finally, the partition walls 11 are formed using a thick film resist (FIG. 15D; second substrate 102 unit).

Figure 15E:
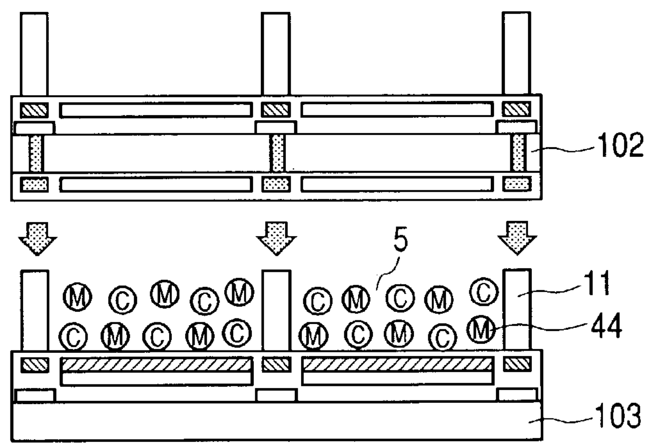

Next, the cells formed on the third substrate 103 are each filled with an insulating liquid 5 in which magenta positively charged particles 44 and cyan negatively charged particles 45 have been dispersed. For the insulating liquid, isoparaffin (trade name: ISOPER; available from Exxon Chemical Co.) is used, and 0.01 to 1% by weight of a suitable charge control agent is added thereto. Then, the second substrate 102 unit is disposed on the top faces of the partition walls 11 of the third substrate 103 unit. Thereafter, the second substrate 102 unit and the partition walls are sufficiently brought into contact to remove air bubbles, in the state of which the periphery of the third substrate 103 unit and second substrate 102 unit is sealed (FIG. 15E).

Figure 15F:
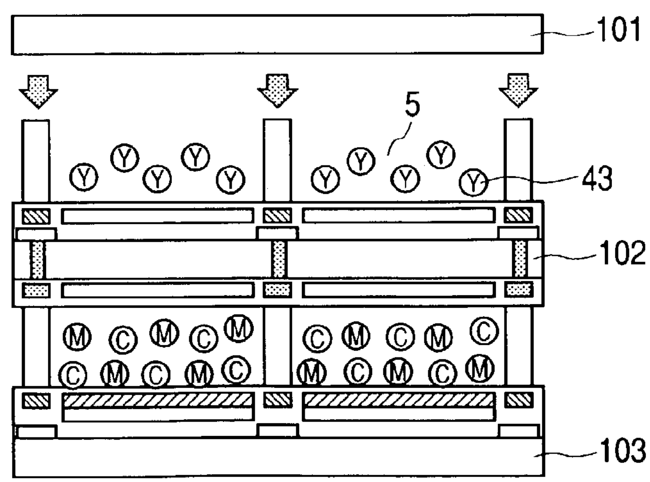

Further, the cells formed on the second substrate 102 are each filled with an insulating liquid 5 in which yellow positively charged particles 43 have been dispersed. Finally, as the first substrate 102, a glass substrate of 0.5 mm in thickness is disposed on the top faces of the partition walls 11 of the second substrate 102 unit, and then the periphery of the second substrate 102 unit and first substrate 101 is sealed in the same way. Thus the electrophoretic display device is completed (FIG. 15F).

The electrophoretic display device thus fabricated was connected to a driving device (not shown) to inspect display operation.

First, as whole area initial reset operation, selection signals are applied to all the scanning lines to set the gates of all the pixels ON, in the state of which 0 V is applied to all the signal lines, and at the same time 300 ms rectangular pulses of −20 V, −20 V and +20V are applied to the first collection electrodes, the second collection electrodes and the third collection electrodes, respectively, to make the yellow particles, the magenta particles and the cyan particles collect to the first collection electrodes, the second collection electrodes and the third collection electrodes, respectively. After the pulses have been applied, non-selection signals are applied to all the scanning lines to set the gates of all the pixels OFF to complete the initialization reset operation. In the state of initial reset, the whole area stands white.

Writing operation is made by applying selection signals to the scanning sines in order in the same manner as in usual active matrix drive, and applying to the signal lines the corresponding writing signals corresponding to the scanning lines selected in synchronization with selection periods. In this Example, there are three scanning lines corresponding to the first display electrodes, second display electrodes and third display electrodes for each scanning rows, and hence it follows that, in order to rewrite one picture, scanning is time sequentially performed 100 rows×3 lines=300 times. There are no particular limitations on the order of the scanning. In this Example, scanning is performed in the order of the first display electrodes, second display electrodes and third display electrodes on the first row, the first display electrodes, second display electrodes and third display electrodes on the second row, and so on. Writing signals for writing the desired colors have already been described in the preferred embodiments, and are not repeated here.

The display images obtained by the above method were bright and sharp, bringing the effect as expected.

EXAMPLE 2

In this Example, another example is described in regard to a color electrophoretic display device in which, like Example 1, pixels so structured that two unit cells are stacked (disposed in a stack) to constitute each pixel are arranged in a matrix.

Figure 16A:
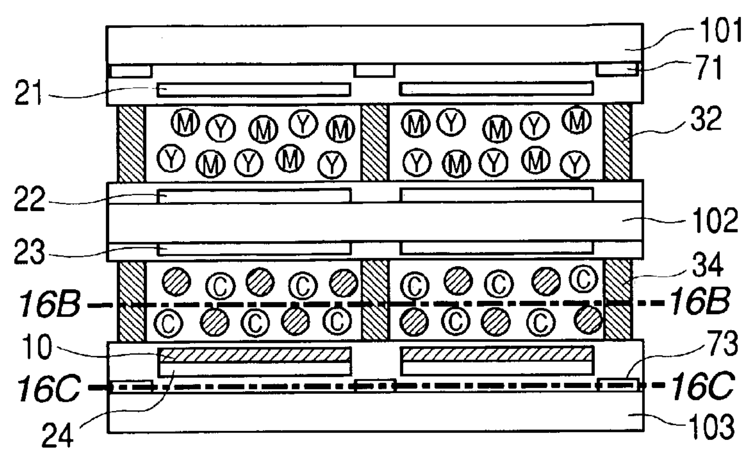
FIGS. 16A, 16B and 16C are structural views in Example 2 (stacked disposition type, type 2).
Figure 16B:
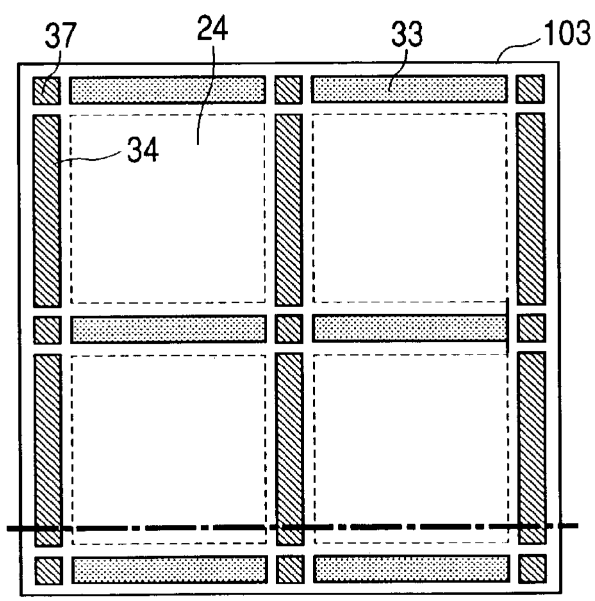
Figure 16C:
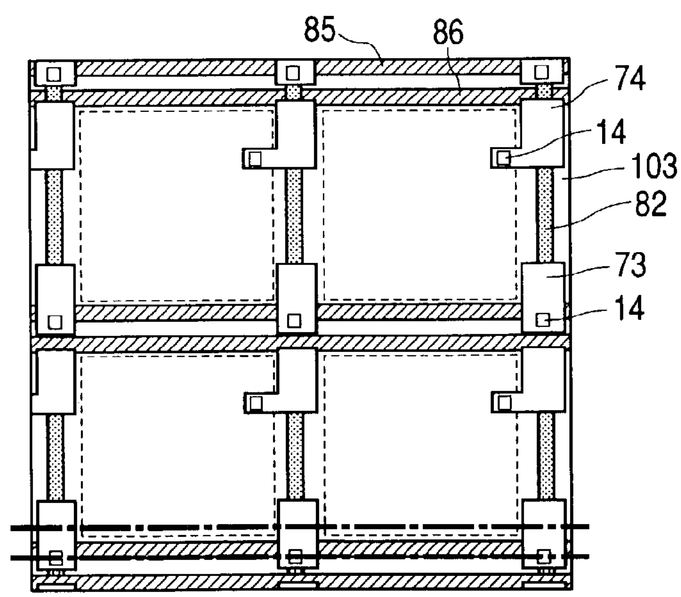

The display device to be fabricated have 100×100 pixels, and each pixel has a size of 200 μm×200 μm. FIGS. 16A to 16C present a cross sectional view (FIG. 16A) of areas corresponding to 2×2 pixels which are part of the display device, a plan view (FIG. 16B) along the line 16B-16B in FIG. 16A, and a plan view (FIG. 16C) along the line 16C-16C in FIG. 16A.

Figure 3C:
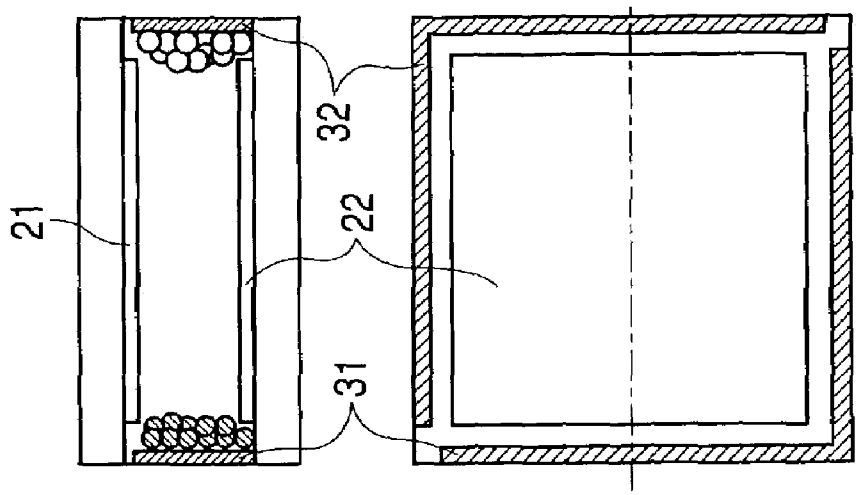
FIGS. 3A, 3B and 3C are cross sectional views showing variations of the structure of the unit cell.
Figure 3B:
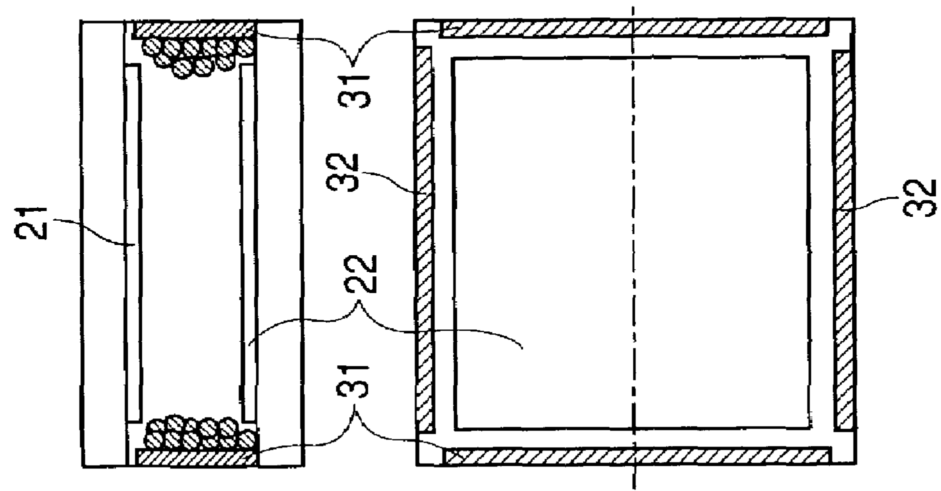
Figure 3A:
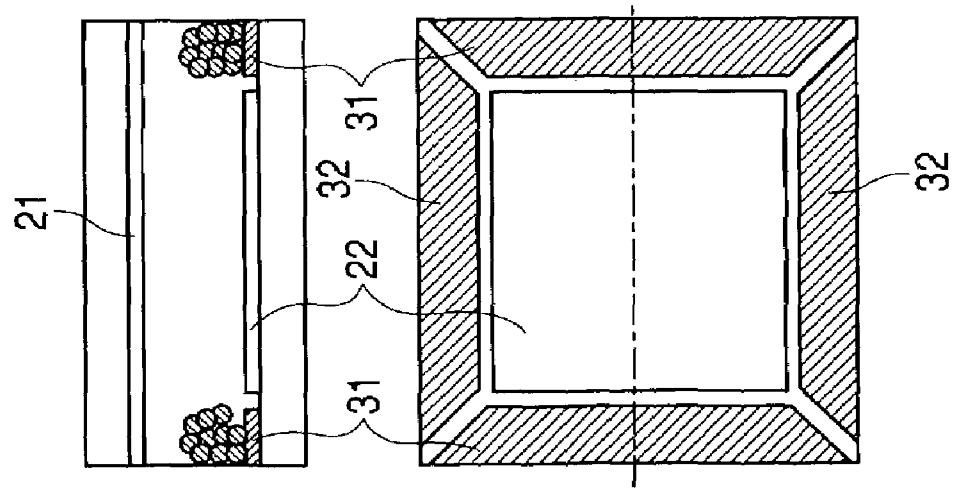

The unit cell structure in this Example corresponds to that shown in FIG. 3B. At both the lower stage and the upper stage, a unit cell II containing an electrophoretic liquid in which two kinds of colored electrophoretic particles having different colors and charge characteristics have been dispersed, two display electrodes and two collection electrodes is disposed.

The respective colored electrophoretic particles are translucent polymer particles colored with dyes. The charge polarity of the colored electrophoretic particles is controlled by the charge control agent modified on particle component polymer materials and on particle surfaces. In this Example, in the electrophoretic liquid in the upper stage unit cell and in that of the lower stage unit cell, yellow positively charged particles and magenta negatively charged particles, and black positively charged particles and cyan negatively charged particles, respectively, are dispersed. The particles all have an average particle diameter of 1 to 2 μm.

The substrates consist of a first substrate 101 serving as the display side substrate of the upper stage unit cell, a second substrate 102 serving as the back substrate of the upper stage unit cell and also as the display side substrate of the lower stage unit cell, and a third substrate 103 serving as the back substrate of the lower stage unit cell. The pixels are each square in planar shape. In each unit cell, a first display electrode 21 is disposed at the pixel middle area on the back (upper stage unit cell side), a second display electrode 22 and a third display electrode 23 are disposed at the pixel middle areas on the surface (upper stage unit cell side) and back (lower stage unit cell side), respectively, of the second substrate 102; and a fourth display electrode 24, at the pixel middle area on the third substrate 103 (FIG. 16A and 16B). A remarkable feature of this Example lies in that a conductive material is used in the partition walls and the partition walls themselves serve as collection electrode. Setting partition walls facing each other in each unit cell as a pair of collection electrodes, a first collection electrode 31 (unseen in the drawings, but corresponding to electrodes 33 in FIG. 16B) and a second collection electrode 32, and a third collection electrode 33 and a fourth collection electrode 34, are disposed in the upper stage unit and the lower stage unit cell, respectively.

The respective collection electrodes need not be insulated for each pixel, and are common electrodes to which adjoining pixels are mutually electrically conducted through wirings (not shown) disposed at the lower part of the collection electrodes (FIG. 16B). On the other hand, the respective display electrodes are insulated from one another, and their potentials are independently controlled by a switching element connected for each display electrode. In this Example, for each cell, a first switching element 71 connected to the first display electrode 21 and a second switching element 72 (unseen in the drawings, but corresponding to a switching element 74 in FIG. 16C) connected to the second display electrode 22 are disposed at the pixel boundary region on the back of the first substrate 101, and a third switching element 73 connected to the third display electrode 23 and a fourth switching element 74 connected to the fourth display electrode 24 are disposed at the pixel boundary region on the surface of the third substrate 103 (FIG. 16C). The first switching element 71 and the fourth switching element 74 are connected to the first display electrode 21 and the fourth display electrode 24, respectively, through contact holes. The second switching element 72 and the third switching element 73 are connected to the second display electrode 22 on the surface of the second substrate 102 and the third display electrode 23 on the back of the second substrate 102, respectively, via columnar electrodes 36 (unseen in the drawings) and columnar electrodes 37 disposed on the back of the first substrate 101 and on the surface of the third substrate 103, respectively, at the part where the partition walls cross at corners. The switching elements are FET type thin film transistors (TFTs), and control the potentials of display electrodes connected to drain electrodes by applying a desired voltage to signal lines connected to source electrodes and to scanning lines connected to drain electrodes.

A fabrication process for the electrophoretic display device according to this Example is described below with reference to FIGS. 17A to 17F. In this Example, the first substrate 101 is first prepared in a reversed state and, in the final step, a second substrate 102 unit and a third substrate 103 unit are stacked on a first substrate 101 unit in a reversed state.

Figure 17A:
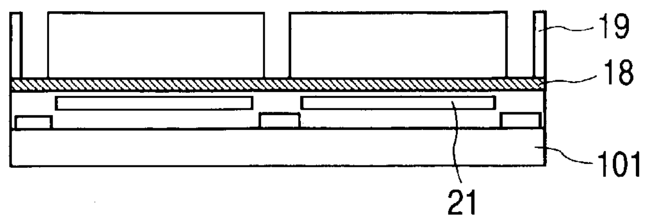
FIGS. 17A, 17B, 17C, 17D, 17E and 17F illustrate a cell fabrication process in Example 2 (stacked disposition type, type 2).

For the first substrate 101, a glass substrate of 0.5 mm in thickness is used. First, first scanning electrode lines, second scanning electrode lines and gate electrodes are formed using Cr, then an SiN film is formed on the whole surface, thereafter a-Si layer/$n^+$layer are formed to provide switching element areas, and then source electrodes, drain electrodes, first signal electrode lines and first common electrode lines are successively formed (all not shown), followed by patterning to form the first switching elements 71 and second switching elements 72, which are bottom gate type FETs. Then, these are covered with an insulating layer, and thereafter contact holes 14 (corresponding to what is denoted by reference numeral 14 in FIG. 16C) are made in the insulating layer. On this insulating layer, first display electrodes 21 and second common electrode lines (not shown) are formed in a thin film of ITO. The first display electrodes 21 are connected to the drain electrodes of the first switching elements 71 through the contact holes 14. Subsequently, these are covered with a resin insulating layer 18, and then further contact holes 14 are formed at drain electrodes areas of the second switching elements 72 disposed at cross points of first common electrode lines, at cross points of second common electrode lines and pixel boundaries and at cross points of partition walls. Next, on this insulating layer 18, an electrode film for plating (not shown) is formed, and a thick film resist pattern 19 is formed thereon (FIG. 17A).

Figure 17B:
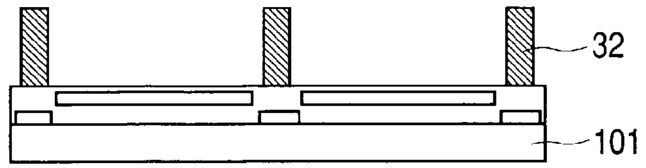

Then, electrolytic plating is effected on the areas where the electrode film for plating stand uncovered, to form first collection electrodes 31, second collection electrodes 32 and first columnar electrodes 36, which all serve also as partition walls together (the first columnar electrodes 36 are unseen in the drawings, but correspond to electrodes 37 in FIG. 16B). In the course of this step, the respective collection electrodes are connected to the first common electrode lines or the second common electrode lines, and the first columnar electrodes 36 are connected to the drain electrode areas of the second switching elements 72. Next, the thick film resist pattern 19 is removed by dissolving it, and subsequently the electrode film for plating thus uncovered and the surfaces of the collection electrodes and first columnar electrodes 36 are anodized in an aqueous oxalic acid solution to make the electrode film for plating insulative and transparent and also form an insulating layer on the surfaces of the collection electrodes and first columnar electrodes 36 (FIG. 17B; first substrate 101 unit).

Figure 17C:
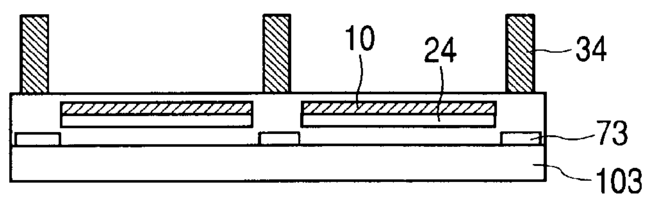

For the third substrate 103, a glass substrate of 1.1 mm in thickness is used. On the surface of the third substrate 103, third switching elements 73, fourth switching element 74, third scanning electrode lines 85, fourth scanning electrode lines 86, second signal electrode lines 82, (those shown in FIG. 16C), third common electrode lines, fourth common electrode lines, fourth display electrodes 24, third display electrodes 33, fourth collection electrodes 34 and second columnar electrodes 37 (those shown in FIG. 16B), are successively formed by substantially the same process as that for the first substrate 101 (FIG. 17C; third substrate 103 unit). What differs from the first substrate 101 lies in that, as a material for the fourth display electrodes 24, Al is used as having a high reflectance, and also that the surfaces of the fourth display electrodes 24 are covered with acrylic resin layers 10 containing fine titanium oxide particles. In this Example, the fourth display electrodes 24 serve also as light reflection layers, and the acrylic resin layers 10 function as light scattering layers.

Figure 17D:
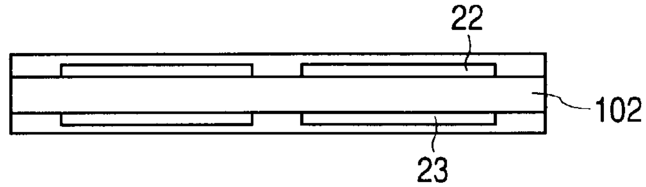

For the second substrate 102, a glass substrate of 0.1 mm in thickness is used. Second display electrodes 22 and third display electrodes 23 are formed on the surface of the second substrate 102 and the back thereof, respectively (FIG. 17D; third substrate 103 unit). The respective display electrodes are, in order to ensure their conduction to the columnar electrodes, provided with pad electrodes extending to the position corresponding to the partition wall cross points at the pixel boundaries. The respective display electrodes are, except their pad areas, covered with insulating layers, and thereafter an adhesive is printed on the pad areas. The adhesive is one prepared by dispersing conductive fine particles in a low melting resin binder, and the conduction is established simultaneously when bonded by heat bonding.

Figure 17E:
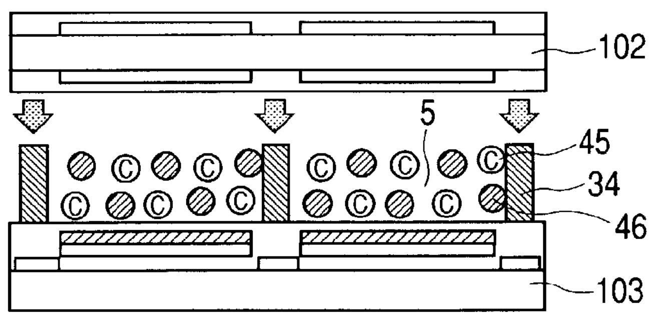

Next, the cells formed on the third substrate 103 are each filled with an insulating liquid 5 in which black positively charged particles 46 and cyan negatively charged particles 45 have been dispersed. For the insulating liquid, isoparaffin (trade name: ISOPER; available from Exxon Chemical Co.) is used. Then the second substrate 102 unit is disposed on the top faces of the partition walls 11 of the third substrate 103 unit. In this state, the second substrate 102 unit is, with heating, uniformly pressed against the top faces of the collection electrodes partition walls 34, and the second columnar electrodes 37 and the pad areas of the third display electrodes 23 are joined with an adhesive. Thereafter, the periphery of the third substrate 103 unit and second substrate 102 unit is sealed (FIG. 17E).

Figure 17F:
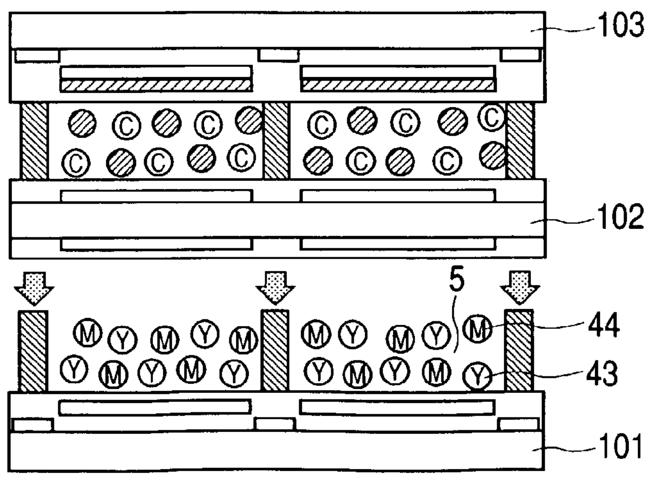

Finally, the cells formed on the second substrate 102 are each filled with an insulating liquid 5 in which yellow positively charged particles 43 and magenta negatively charged particles 44 have been dispersed. Then, the second substrate 102 unit and the third substrate 103 unit which have already been joined are disposed thereon in a stack. The both are joined in the same way, and their periphery is sealed in the same way. Thus the electrophoretic display device is completed (FIG. 17F).

The electrophoretic display device thus fabricated was driven in the same manner as in Example 1 to inspect display operation. The display images obtained were bright and sharp, bringing the effect as expected.

EXAMPLE 3

Figure 18A:
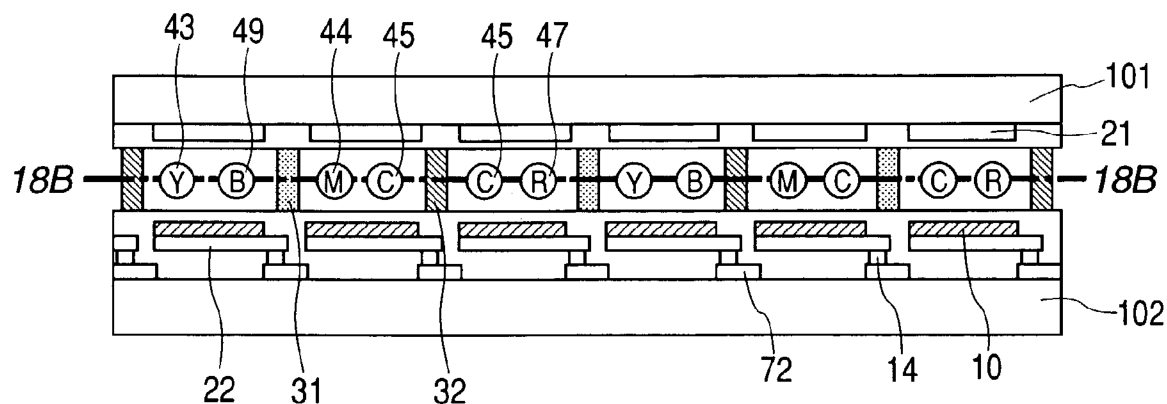
FIGS. 18A and 18B are structural views in Example 3 (parallel disposition type).
Figure 18B:
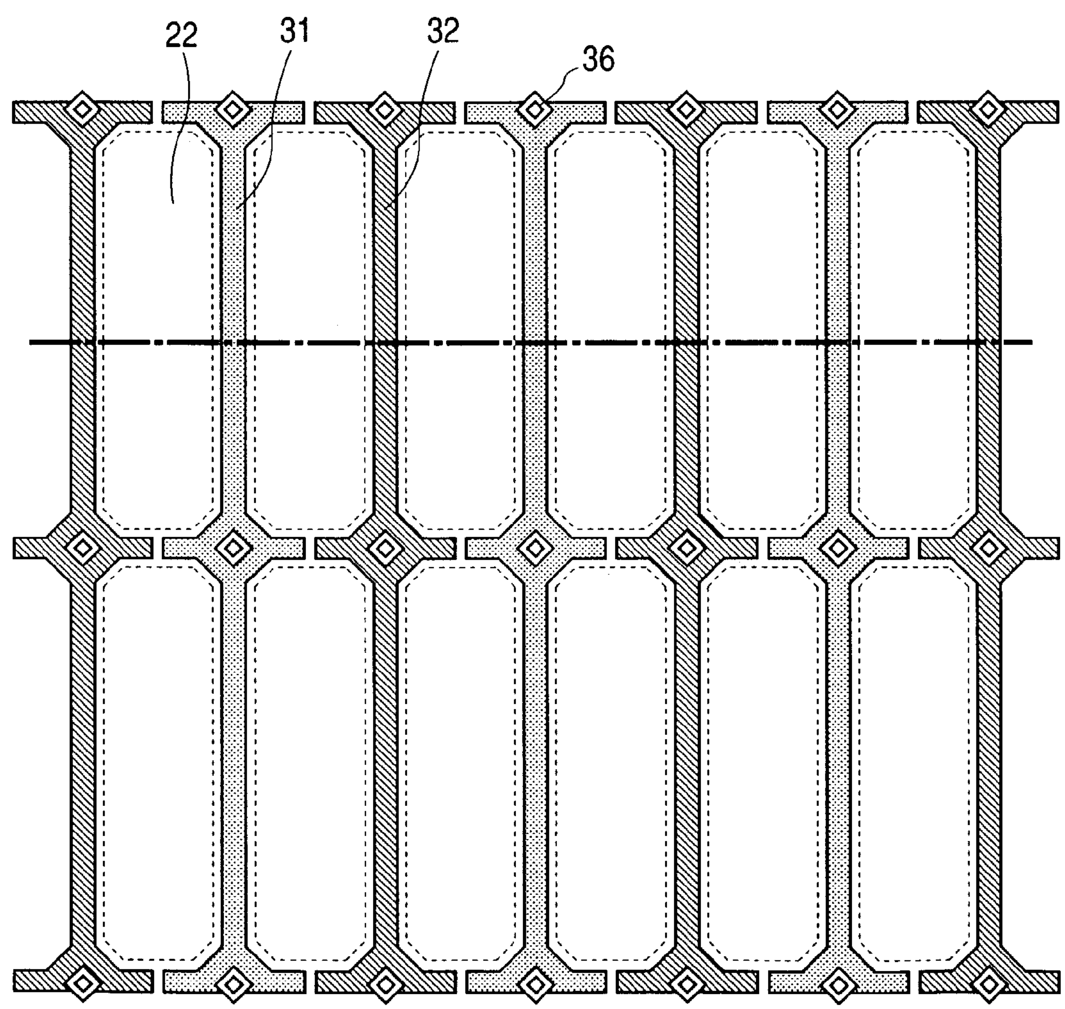

In this Example, described is a color electrophoretic display device in which pixels so structured that three unit cells are disposed in parallel to constitute each pixel are arranged in a matrix. The display device to be fabricated have 100×100 pixels, and each pixel has a size of 300 μm×300 μm. FIGS. 18A and 18B present a cross sectional view (FIG. 18A) of areas corresponding to 2×2 pixels which are part of the display device, and a plan view (FIG. 18B) along the line 18B-18B in FIG. 18A.

Each pixel in this Example is constituted of three unit cells of 100 mm in width and 300 μm in length which are disposed in parallel, and contains an electrophoretic liquid in which two kinds of colored electrophoretic particles have been dispersed. The respective colored electrophoretic particles are translucent polymer particles colored with dyes. A first cell (left side), a second cell (middle) and a third cell (right side) are filled with insulating liquids in which yellow positively charged particles 43 and blue negatively charged particles 49, magenta positively charged particles 44 and green negatively charged particles 48, and cyan positively charged particles 45 and red negatively charged particles 47, respectively, stand dispersed therein. The particles all have an average particle diameter of 1 to 2 μm.

The substrates consist of a first substrate 101 serving as the display side substrate and a second substrate 102 serving as the back substrate. The pixels are each square in planar shape. At the middle area of each unit cell, a first display electrode 21 and a second display electrode 22 are on the first substrate (display side substrate) 101 and the second substrate (back substrate) 102, respectively (FIGS. 18A and 18B). The respective unit cells are divided by conductive partition walls 31 and 32 which function as collection electrodes like those in Example 2.

Conductive partition walls facing each other along the unit cell lengthwise direction and with the display electrodes positioned therebetween function as first collection electrodes 31 and second collection electrodes 32.

The respective collection electrodes need not be insulated for each pixel. In this Example, the collection electrode partition walls form lines connected between unit cells in the unit cell lengthwise direction, and lines of collection electrodes insulated from one another are alternately arranged in the unit cell width direction. Meanwhile, the respective display electrodes are insulated from one another, and their potentials are independently controlled by a switching element connected for each display electrode. In this Example, for each cell, a first switching element 71 (unseen in the drawings) connected to the first display electrode 21 and a second switching element 72 connected to the second display electrode 22 are disposed at the pixel boundary region on the surface of the first substrate (back substrate) 101 (FIG. 18A). First switching elements 71 disposed at the partition wall cross points are connected to the first display electrodes 21 on the display side substrate through contact holes 14 therefor (unseen in the drawings). The switching elements are FET type thin film transistors (TFTs), and control the potentials of display electrodes connected to drain electrodes by applying a desired voltage to signal lines connected to source electrodes and to scanning lines connected to drain electrodes.

A fabrication process for the electrophoretic display device according to this Example is described below with reference to FIGS. 19A to 19C.

Figure 19A:
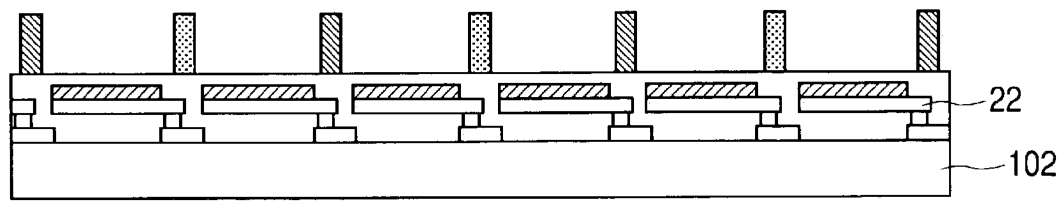
FIGS. 19A, 19B and 19C illustrate a cell fabrication process in Example 3 (parallel disposition type).
Figure 19B:
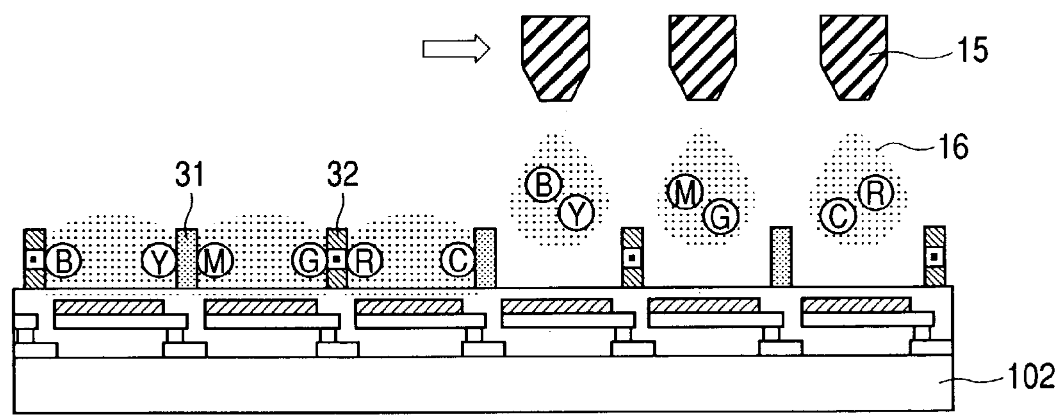
Figure 19C:
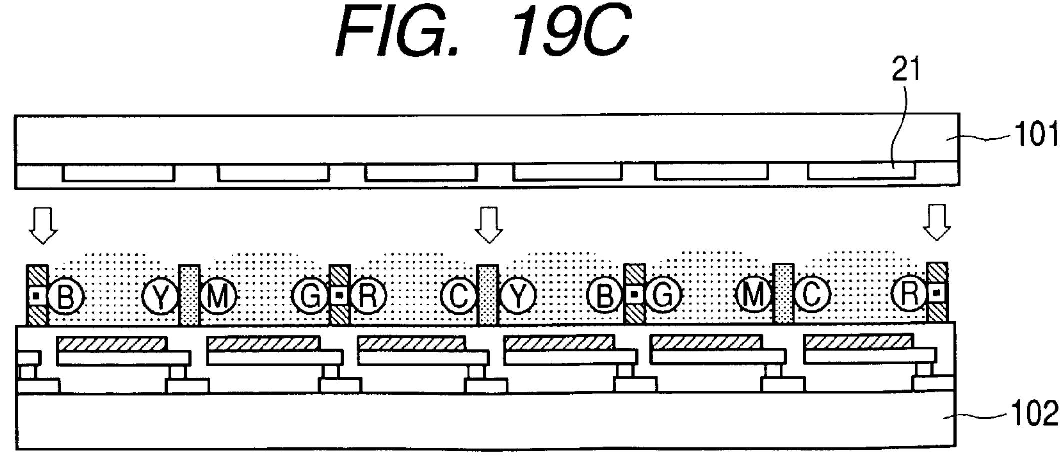

First, using a glass substrate of 1.1 mm in thickness, a second substrate (back substrate) 102 unit is fabricated (FIG. 19A). Its fabrication process is substantially the same as that for the third substrate 103 unit in Example 2, and the description is not repeated.

The respective display electrodes are, in order to ensure their conduction to columnar electrodes 36, provided with pad electrodes extending to the position corresponding to the partition wall cross points at the pixel boundaries. The respective display electrodes are, except their pad areas, covered with insulating layers, and thereafter an adhesive is printed on the pad areas. The adhesive is one prepared by dispersing conductive fine particles in a low melting resin binder, and the conduction is established simultaneously when bonded by heat bonding.

Next, an insulating liquid in which colored electrophoretic particles have been dispersed is prepared with which the cells formed on the back substrate 102 are each to be filled. For the insulating liquid, isoparaffin (trade name: ISOPER; available from Exxon Chemical Co.) is used. In this Example, liquids in which different kinds of particles have been dispersed must be put in the unit cells adjoining to one another. Accordingly, three kinds of droplets 16 of the liquids each containing particles for one unit cell are successively injected by means of an ink jet device having a multi nozzle (three nozzles). When injected, a voltage is applied across the first collection electrodes 31 and the second collection electrodes 32 so that the particles injected are collected to the collection electrodes immediately after they have been shot in, to prevent the particles from being transported to pixels to pixels (FIG. 19B; back substrate 102 unit).

For the first substrate (display side substrate) 101, a glass substrate of 0.5 mm in thickness is used. First display electrodes 21 are formed on the back of the display side substrate 101 to prepare a display side substrate 101 unit. Subsequently, in the state that a voltage is applied across the collection electrodes, the display side substrate 101 unit is disposed on the top faces of the partition walls of the back substrate 102 unit. In this state, the display side substrate 101 unit is, with heating, uniformly pressed against the top faces of the partition walls, and the columnar electrodes 36 and the pad areas of the first display electrodes 21 are joined with an adhesive. Thereafter, the periphery of the display side substrate (first substrate) 101 unit and back substrate (second substrate) 102 unit is sealed. Thus the electrophoretic display device is completed (FIG. 19C).

The electrophoretic display device thus fabricated was driven in the same manner as in Example 1 to inspect display operation. The display images obtained were bright and sharp, bringing the effect as expected.

EXAMPLE 4

In this Example, microcapsules are introduced in the structure of Example 2. Structural features differ from Example 2 in that a microcapsule having enclosed two kinds of particles and an insulating liquid is disposed in each unit cell divided by upper and lower substrates and partition walls and that the intermediate substrate second substrate (102) is removed. The structure and size other than these are the same as those in Example 2, and detailed description is not repeated.

In the following, a fabrication process for the electrophoretic display device is described below with reference to FIGS. 20A to 20E, limiting to what are characteristic of this Example.

Figure 20A:
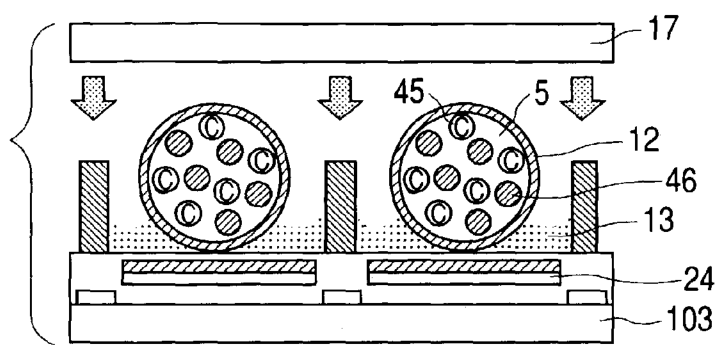
FIGS. 20A, 20B, 20C, 20D and 20E illustrate a cell fabrication process in Example 4 (stacked disposition microcapsule type).

First, using a glass substrate of 1.1 mm in thickness, a back substrate 103 unit having fourth display electrodes 24 is fabricated (FIG. 20A). Its fabrication process is substantially the same as that for the third substrate 103 unit in Example 2, and the description is not repeated.

As methods of producing microcapsules for electrophoretic display, interfacial polymerization, in situ polymerization, phase separation (coacervation) and so forth are reported. In this Example, microcapsules 12 having enclosed an insulating liquid 5 in which cyan particles 45 and back particles 46 have uniformly been dispersed are produced. Uniform microcapsules having an average capsule diameter of about 90±10 μm are obtained through classification treatment. These microcapsules 12 are mixed with an ultraviolet curable resin binder 13 whose viscosity has properly been adjusted, and the resulting resin composition is spread by means of a bar coater over the back substrate 103 on which partition walls have been formed. Feeding the resin composition additionally, the bar coater is sweepingly moved with repetition of about 10 times, so that a state is achieved in which pixel unit cells are filled therein with the microcapsules 12 one by one substantially over the whole area.

Figure 20B:
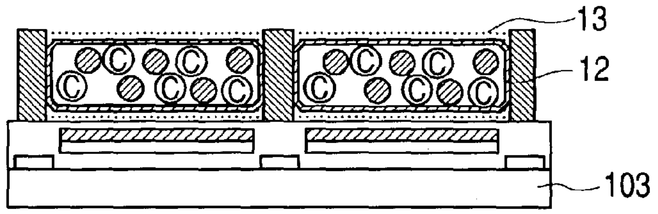

Next, a glass substrate 17 for flatting which has been covered with a fluorine resin film is slowly pressed against the microcapsules 12 held between the partition walls on the back substrate 103 (FIG. 20A), to make the microcapsules 12 become flat gradually. In the state the glass substrate surface has come into uniform contact with the partition wall top faces and microcapsule surfaces over the whole area, the resin composition is irradiated with ultraviolet rays from the top side of the flatting glass substrate 17 to cause the resin binder 13 to cure. After the curing, the flatting glass substrate 17 is peeled off. Thus, microcapsules 12 having been made flat are each fixed in the interior of the resin binder whose surface has been made flat (FIG. 20B).

Figure 20C:
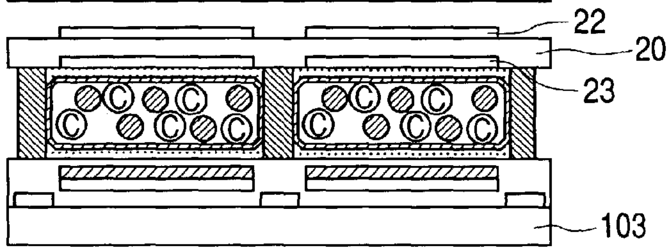
Figure 20D:
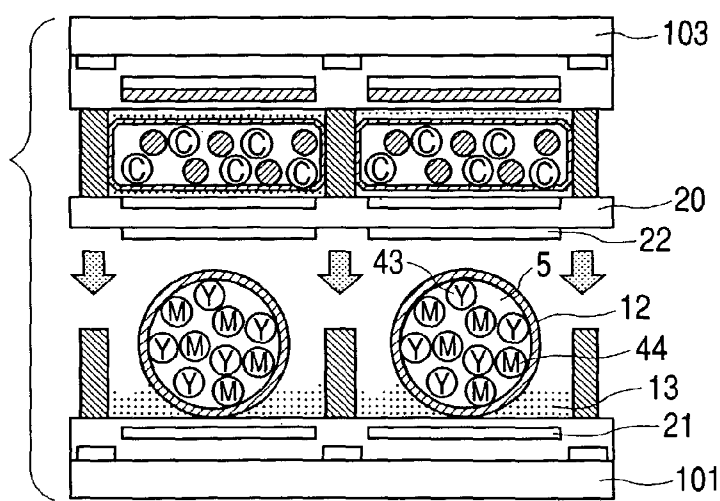

Next, making the surface flatted resin binder serve as insulating layers, contact holes (14 in Example 2) are formed therein at their columnar electrode areas. Subsequently, on the insulating layers, third display electrodes 23 comprised of PEDOT (trade name; available from AGFA Co.) are formed. The third display electrodes 23 are, in order to ensure their conduction to second columnar electrodes (37 in Example 2), provided with pad electrodes extending to the position corresponding to the partition wall cross points at the pixel boundaries. These electrodes are further covered with a resin insulating layer 20 over their whole areas, and thereafter second display electrodes 22 are formed thereon using PEDOT again (FIG. 20C). The second display electrodes 22 are also provided with pad electrodes (not shown) extending to the position corresponding to the partition wall cross points at the pixel boundaries.

Figure 20E:
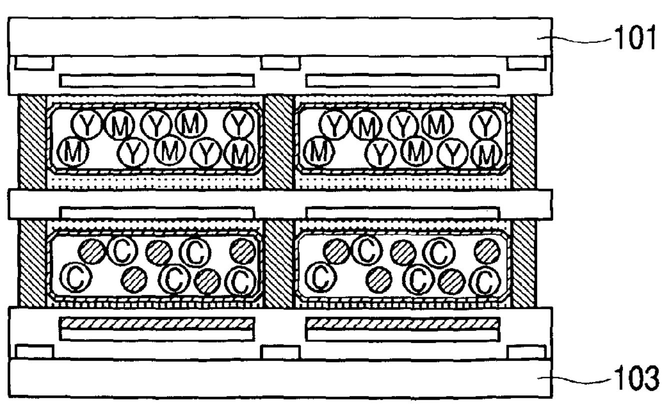
Figure 21A:
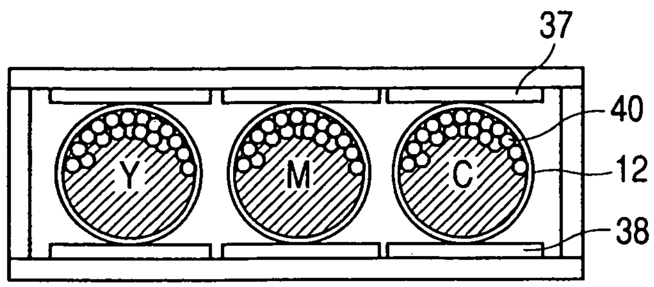
FIGS. 21A, 21B, 21C and 21D illustrate a color display method in a conventional example (vertical movement type microcapsules).
Figure 21B:
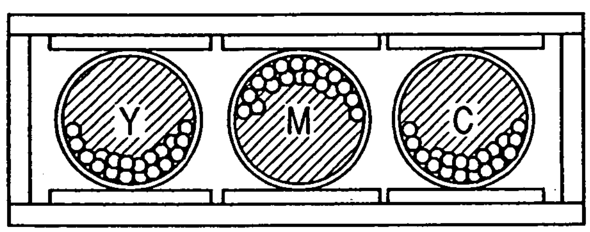
Figure 21C:
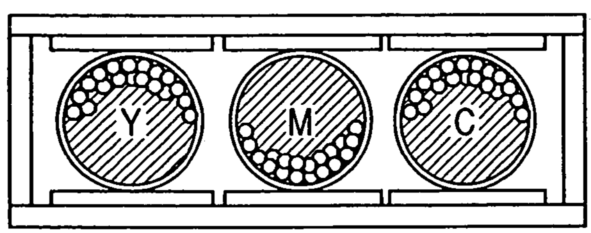
Figure 21D:
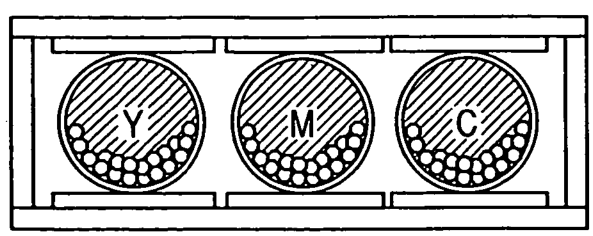
Figure 22A:
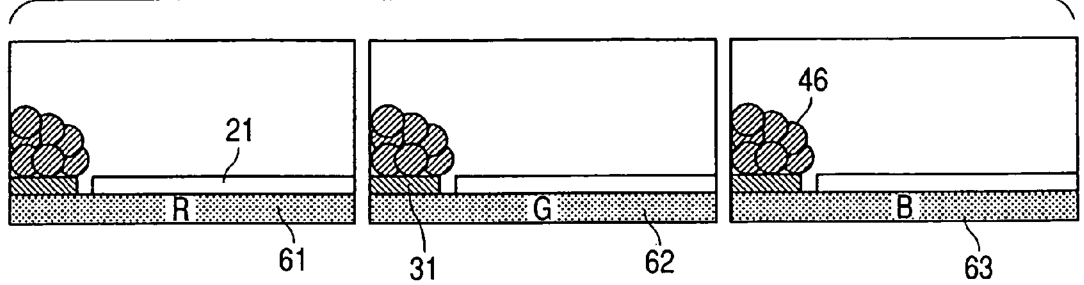
FIGS. 22A, 22B, 22C and 22D illustrate a color display method in a conventional example (horizontal movement type).
Figure 22B:
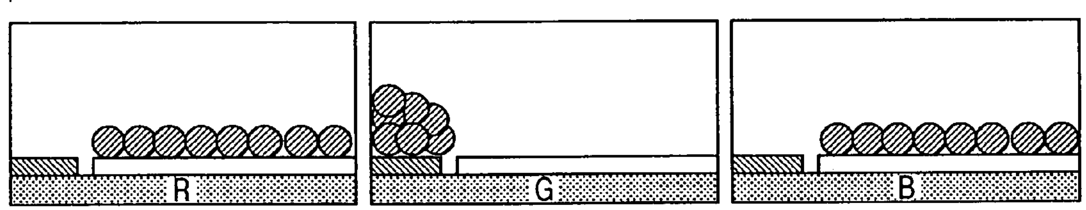
Figure 22C:
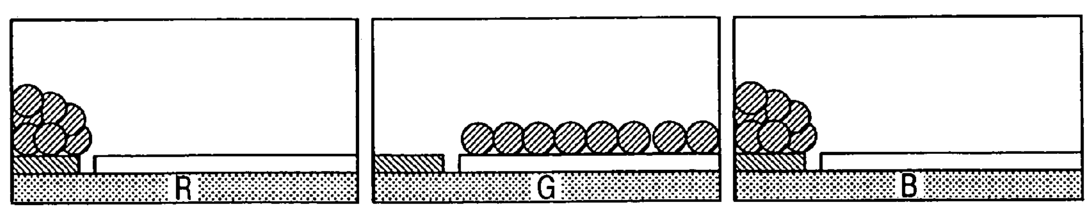
Figure 22D:
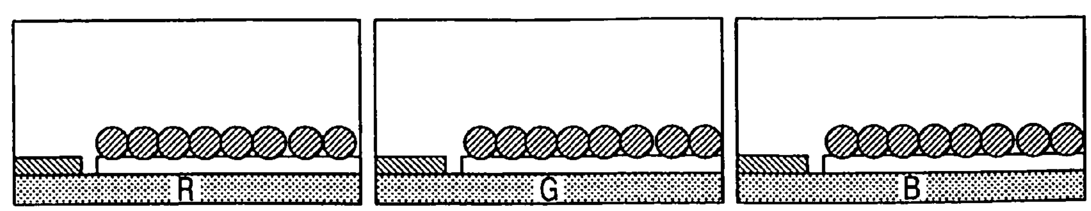
Figure 23A:
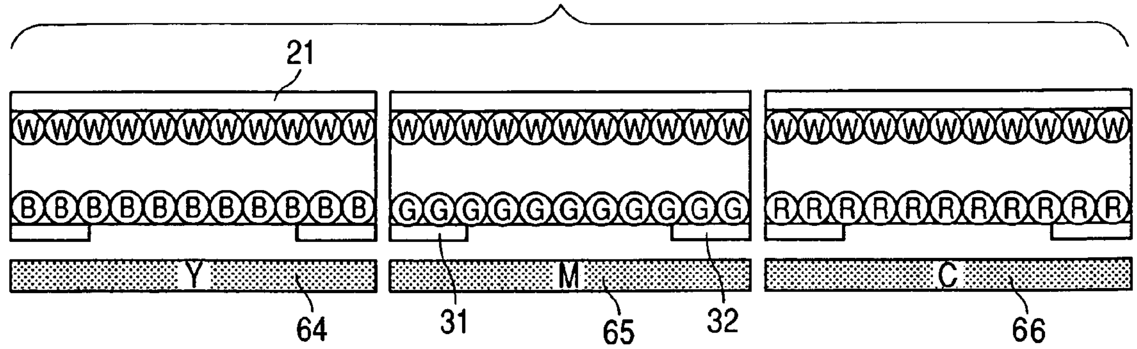
FIGS. 23A, 23B, 23C and 23D illustrate a color display method in a conventional example (dual particle curtain mode).
Figure 23B:
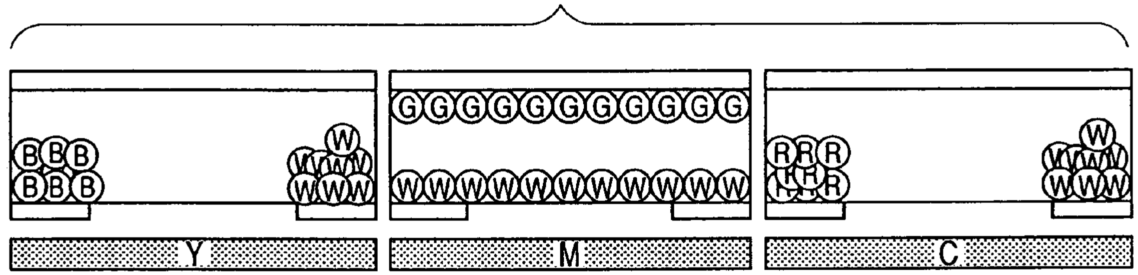
Figure 23C:
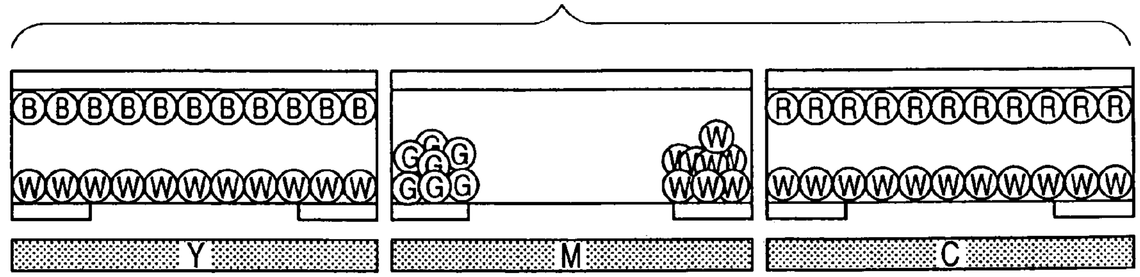
Figure 23D:
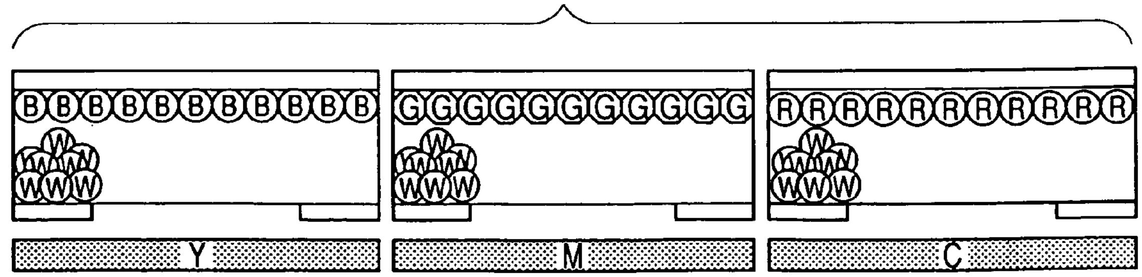

Next, using a glass substrate of 0.5 mm in thickness, a display side substrate 101 unit having first display electrodes 24 (FIG. 20D) is fabricated. Further, in the same manner as the case of the back substrate 103, a resin composition composed of a mixture of microcapsules 12 having enclosed an insulating liquid 5 in which yellow particles 43 and magenta particles 44 have uniformly been dispersed and an ultraviolet curable resin binder 13 is spread over the display side substrate 101. Thus, pixel unit cells are filled therein with the microcapsules 12 one by one. Then, a conductive adhesive of an ultraviolet curable resin type is printed on pad areas of the second display electrodes 22 formed on the back substrate 103. Thereafter, the back substrate 103 unit on which so far as the second display electrodes 22 have been formed is turned upside down and its second display electrodes 22 surfaces are slowly pressed against the microcapsules 12 held between the partition walls (FIG. 20D), to make the microcapsules 12 become flat gradually. In the state the resin insulating layer 20 and the second display electrode 22 surfaces have come into uniform contact with the partition wall top faces and the microcapsule surfaces, respectively, over the whole area, the resin composition is irradiated with ultraviolet rays from the side of the display side substrate 101 to cause the resin binder 13 to cure. Thus, microcapsules 12 having been made flat are each fixed in the interior of the resin binder whose surface has been made flat (FIG. 20E).

The electrophoretic display device thus fabricated was driven in the same manner as in Example 1 to inspect display operation. The display images obtained were bright and sharp, bringing the effect as expected.

TABLE 1

| Figure showing pixel structure | Theoretical reflectance White (%) | Theoretical reflectance Monochrome (%) | Theoretical reflectance Complementary color (%) | Theoretical reflectance Black (%) | Effective reflectance* White (%) | Effective reflectance* Monochrome (%) | Effective reflectance* Complementary color (%) | Effective reflectance* Black (%) |
|---|---|---|---|---|---|---|---|---|
| Present invention | | | | | | | | |
| FIG. 8A*1 | 100 | 33 | 66 | 0 | 72 | 24 | 48 | 0 |
| FIG. 8B*2 | 100 | 33 | 66 | 0 | 65 | 21 | 43 | 0 |
| FIG. 10*3 | 100 | 22 | 22 | 0 | 72 | 14 | 14 | 0 |
| FIG. 10*4 | 100 | 22 (33) | 22 (33) | 0 | 72 | 14 (24) | 14 (24) | 0 |
| FIG. 12*5 | 100 | 22 (33) | 44 | 0 | 72 | 14 (24) | 32 | 0 |
| Conventional Examples | | | | | | | | |
| FIG. 21A-21D*6 | 100 | 11 (55) | 22 (44) | 66 | 90 | 10 (50) | 20 (40) | 60 |
| FIG. 21A-21D*7 | 66 | 11 (33) | 22 | 0 | 60 | 10 (30) | 20 | 0 |
| FIG. 22A-22D*8 | 33 | 11 | 22 | 0 | 26 | 9 | 18 | 0 |
| FIG. 22A-22D*9 | 100 | 11 (55) | 22 (33) | 33 | 80 | 9 (53) | 18 (26) | 26 |
| FIG. 23A-23D*10 | 100 | 22 (33) | 44 | 33 | 72 | 16 (24) | 32 | 24 |

*Taking account of open area ratio ITO absorption.
*1One-kind-particle two-electrode cell + two-kind-particle four-electrode cell are disposed in a stack; subtractive mixture.
*2Two-kind-particle four-electrode cells are disposed in a stack; subtractive mixture.
*3Two-kind-particle four-electrode cells are disposed in parallel; add. + sub. mixture.
*4The same structure as the above, but 3rd cells perform white display in the monochrome display and complementary-color display.
*5Two-kind-particle four-electrode cells are disposed in parallel; add. + sub. mixture.
*6One-kind-particle two-electrode upper and lower cells; additive mixture; white particles.
*7The same structure as the above, but black particles.
*8One-kind-particle two-electrode horizontal cells; additive mixture; black particles.
*9The same structure as the above, but white particles.
*10Two-kind-particle three-electrode cells; additive mixture.

What is claimed is:

1. An electrophoretic display device comprising unit cells each containing i) two display electrodes and two collection electrodes, ii) a clear electrophoretic liquid and iii) two kinds of translucent colored electrophoretic particles having charge polarities different from each other, the unit cells being so constructed that the two display electrodes are disposed superimposingly as viewed from the observer side, wherein each of the unit cells has a first state in which the two kinds of colored electrophoretic particles are both attracted to the two collection electrodes, a second state in which only first particles of the two kinds of colored electrophoretic particles are attracted to one of the display electrodes, a third state in which only second colored electrophoretic particles are attracted to one of the display electrodes, and a fourth state in which the two kinds of colored electrophoretic particles are attracted to the two display electrodes separately, and the fourth state exhibits a color by the principle of subtractive mixture of color stimuli of the colored electrophoretic particles separately present on the two display electrodes.

2. The electrophoretic display device according to claim 1, wherein three unit cells are adjacently disposed in a same plane to form a pixel, and combinations of colors of the two kinds of translucent colored electrophoretic particles in each of the three unit cells forming the pixel are respectively one of the three primary colors and a color which provides black by subtractive mixture with one of the three primary colors.

3. The electrophoretic display device according to claim 2, wherein combinations of colors of the two kinds of the translucent colored electrophoretic particles in each of the three unit cells forming a pixel is red and blue, green and blue, and blue and red, respectively.

4. The electrophoretic display device according to claim 2, wherein combinations of colors of the two kinds of the translucent colored electrophoretic particles in each of the three unit cells forming a pixel is red and cyan, green and magenta, and blue and red, respectively.

5. The electrophoretic display device according to claim 2, wherein the pixels comprise microcapsules each enclosing the electrophoretic liquid in which the translucent colored electrophoretic particles have been dispersed.

* * * * *

UNITED STATES PATENT AND TRADEMARK OFFICE

CERTIFICATE OF CORRECTION

PATENT NO. : 7,283,119 B2
APPLICATION NO. : 10/457358
DATED : October 16, 2007
INVENTOR(S) : Etsuro Kishi It is certified that error appears in the above-identified patent and that said Letters Patent is hereby corrected as shown below:

COLUMN 9:

Line 51, "particles-having" should read --particles having--.

COLUMN 18:

Line 33, "second, switching" should read --second switching--.

Signed and Sealed this

Third Day of February, 2009

JOHN DOLL

*Acting Director of the United States Patent and Trademark Office*